(12) United States Patent
Schulte, Jr. et al.

(10) Patent No.: US 6,892,888 B2
(45) Date of Patent: May 17, 2005

(54) SCREEN WITH UNIBODY STRUCTURE

(75) Inventors: David L. Schulte, Jr., Broussard, LA (US); Thomas C. Adams, Hockley, TX (US); Kenneth W. Seyffert, Houston, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 229 days.

(21) Appl. No.: 10/202,406

(22) Filed: Jul. 24, 2002

(65) Prior Publication Data

US 2003/0038061 A1 Feb. 27, 2003

Related U.S. Application Data

(60) Division of application No. 09/834,174, filed on Apr. 12, 2001, now Pat. No. 6,530,483, which is a division of application No. 09/544,572, filed on Apr. 6, 2000, now Pat. No. 6,283,302, which is a continuation-in-part of application No. 09/228,572, filed on Jan. 11, 1999, now Pat. No. 6,152,307, which is a continuation-in-part of application No. 09/183,005, filed on Oct. 30, 1998, now abandoned, which is a continuation-in-part of application No. 09/090,554, filed on Jun. 4, 1998, now Pat. No. 6,267,247, which is a continuation-in-part of application No. 08/895,976, filed on Jul. 17, 1997, now Pat. No. 5,988,397, which is a continuation-in-part of application No. 08/786,515, filed on Jan. 21, 1997, now Pat. No. 5,971,159, and a continuation-in-part of application No. 08/598,566, filed on Feb. 12, 1996, now abandoned, said application No. 08/786,515, and a continuation-in-part of application No. 29/048,575, filed on Jan. 4, 1996, now Pat. No. Des. 377,656, which is a continuation of application No. 29/014,571, filed on Oct. 25, 1993, now Pat. No. Des. 366,040, and a continuation-in-part of application No. 08/105,696, filed on Aug. 12, 1993, now Pat. No. 5,392,924, which is a continuation-in-part of application No. 08/056,123, filed on Apr. 30, 1993, now Pat. No. 5,385,669, said application No. 08/598,566, and a continuation-in-part of application No. 08/504,495, filed on Jul. 25, 1995, now Pat. No. 5,598,930, which is a continuation-in-part of application No. 08/220,101, filed on Mar. 30, 1994, now Pat. No. 5,490,598.

(51) Int. Cl.$^7$ .................................................. B07B 1/46
(52) U.S. Cl. ...................... 209/405; 209/269; 209/408
(58) Field of Search .................................. 209/399, 405, 209/408, 269

(56) References Cited

U.S. PATENT DOCUMENTS 40,242 A   10/1863   Capell (Continued)

FOREIGN PATENT DOCUMENTS

DE   2912228 A   10/1980

(Continued)

OTHER PUBLICATIONS

Mud Equipment Manuel Handbook 3: Shale Shakers, Brandt & Love, Gulf Pub. Co., 1982.

(Continued)

*Primary Examiner*—Donald P Walsh
*Assistant Examiner*—Daniel K Schiak
(74) *Attorney, Agent, or Firm*—Guy McClung

(57) ABSTRACT

A unibody structure for a screen assembly for a vibratory separator, the unibody structure, in certain aspects having an integral body member with a portion having a plurality of spaced-apart openings in a pattern of a plurality of spaced-apart screening openings and including a pair of spaced-apart integral side members made of folded portions that form the pair of spaced-apart integral side members, a pair of spaced-apart integral end members made of folded end portions, the pair of spaced-apart integral end members each with a first end member and a second end member, the first end member configured with a shoulder support portion for sealingly abutting a screen ledge end of an adjacent screen, and the second end member configured with a ledge portion for sealingly abutting a shoulder portion of an end of an adjacent screen, and the plurality of spaced-apart openings of the integral body member defined by a plurality of spaced-apart strips, each adjacent pair of the plurality of spaced-apart strips defining a space through the integral body member and having a length and independent of and not connected to the other strips along its length. In one aspect there is screening material on the unibody structure.

21 Claims, 21 Drawing Sheets

U.S. PATENT DOCUMENTS

| | | |
|---|---|---|
| 236,416 A | 1/1881 | Bourne |
| 246,144 A | 8/1881 | Keeler |
| 268,491 A | 12/1882 | Hubbell |
| 275,190 A | 4/1883 | Gilbert |
| 275,340 A | 4/1883 | Kimball |
| 290,668 A | 12/1883 | Crandle |
| 500,302 A | 5/1893 | Stoecket et al. |
| 516,673 A | 3/1894 | Wilson |
| 526,562 A | 9/1894 | Cross |
| 541,595 A | 6/1895 | Cross |
| 560,858 A | 5/1896 | Missroan |
| 583,981 A | 6/1897 | Plaisted |
| 599,468 A | 2/1898 | Cross |
| 607,598 A | 7/1898 | Closs |
| 777,317 A | 12/1904 | Traylor |
| 865,185 A | 9/1907 | Kerrigan |
| 948,222 A | 2/1910 | Honabach |
| 964,897 A | 7/1910 | Bryant |
| 965,578 A | 8/1910 | Murphy et al. |
| 984,866 A | 2/1911 | Tate |
| 1,082,612 A | 12/1913 | Smith et al. |
| 1,098,979 A | 6/1914 | Schuchard |
| 1,125,762 A * | 1/1915 | Sturtevant .................. 209/347 |
| 1,132,667 A | 3/1915 | Milliot |
| 1,139,041 A | 5/1915 | Larson |
| 1,193,273 A | 8/1916 | Lee |
| 1,212,151 A | 1/1917 | Edmonds |
| 1,242,982 A | 10/1917 | Reynolds |
| 1,248,081 A | 11/1917 | Couch |
| 1,250,768 A | 12/1917 | Baumgartner |
| 1,279,630 A * | 9/1918 | Yoder et al. ................. 209/405 |
| 1,344,747 A | 6/1920 | Wright |
| 1,359,426 A | 11/1920 | Ploisted |
| 1,397,339 A | 11/1921 | Sturtevant |
| 1,423,021 A | 7/1922 | Reynolds |
| 1,432,119 A | 10/1922 | Paxton |
| 1,462,804 A | 7/1923 | Evans |
| 1,505,735 A | 8/1924 | Stabbins |
| 1,561,632 A | 11/1925 | Woodward |
| 1,626,774 A | 6/1927 | Allan |
| 1,614,586 A | 10/1927 | Anderson et al. |
| 1,678,941 A | 7/1928 | Helman |
| 1,713,143 A | 5/1929 | Overstrom |
| 1,716,758 A | 6/1929 | Bland |
| 1,778,558 A * | 10/1930 | Kellog ....................... 209/397 |
| 1,785,195 A | 12/1930 | Hoss et al. |
| 1,822,298 A * | 9/1931 | Kerrigan .................... 209/397 |
| 1,879,377 A | 9/1932 | McNeely |
| 1,939,314 A * | 12/1933 | Neifert ....................... 209/397 |
| 1,950,861 A | 3/1934 | O'Toole, Sr. |
| 1,997,713 A | 4/1935 | Boehm |
| 1,997,740 A | 4/1935 | Nickerson |
| 2,015,139 A | 9/1935 | Dustam |
| 2,052,467 A | 8/1936 | Hermann |
| 2,061,850 A | 11/1936 | Roberts |
| 2,082,513 A | 6/1937 | Roberts |
| 2,089,548 A | 8/1937 | Frantz et al. |
| 2,104,785 A | 1/1938 | Akeyson |
| 2,124,475 A * | 7/1938 | Smith et al. ................. 209/399 |
| 2,190,262 A | 2/1940 | Geist |
| 2,205,004 A * | 6/1940 | Woltz ......................... 209/399 |
| 2,215,226 A | 9/1940 | Meyer |
| 2,251,909 A | 8/1941 | Lindsay |
| 2,267,327 A * | 12/1941 | Grant ......................... 209/269 |
| 2,274,700 A | 3/1942 | Jonks |
| 2,311,813 A | 2/1943 | Beck et al. |
| 2,335,084 A | 11/1943 | Rice |
| 2,355,050 A | 8/1944 | Borton |
| 2,406,051 A | 8/1946 | Weiss |
| 2,462,878 A | 3/1949 | Logue |
| 2,480,320 A | 8/1949 | Carrier |
| 2,511,239 A * | 6/1950 | Behnke ....................... 209/403 |
| 2,648,441 A | 8/1953 | Soldan |
| 2,667,975 A | 2/1954 | Seaholm |
| 2,670,079 A | 2/1954 | Betts |
| 2,677,462 A | 5/1954 | Conkling |
| 2,682,205 A | 6/1954 | Vincent |
| 2,723,032 A | 11/1955 | Gisler et al. |
| 2,726,184 A | 12/1955 | Cox et al. |
| 2,774,477 A | 12/1956 | Pollitz |
| 2,800,227 A | 7/1957 | Kiger |
| 2,813,629 A | 11/1957 | Brugmann |
| 2,827,169 A | 3/1958 | Cusi |
| 2,902,165 A | 9/1959 | Imershein |
| 2,929,464 A | 3/1960 | Sprouse |
| 2,973,865 A | 3/1961 | Cibula |
| 2,980,208 A | 4/1961 | Neumann |
| 2,985,303 A | 5/1961 | Wright |
| 3,057,481 A | 10/1962 | Pale |
| 3,070,231 A | 12/1962 | McCorkel et al. |
| 3,092,573 A | 6/1963 | Lambert et al. |
| 3,162,567 A | 12/1964 | Hellar |
| 3,165,473 A | 1/1965 | Pall et al. |
| 3,176,843 A | 4/1965 | Hoskins et al. |
| 3,243,943 A | 4/1966 | Getzin |
| 3,255,885 A | 6/1966 | Burls |
| 3,285,413 A | 11/1966 | Taylor-Smith |
| 3,339,731 A | 9/1967 | Merges et al. |
| 3,458,978 A | 8/1969 | Davis |
| 3,465,413 A | 9/1969 | Rosaen et al. |
| 3,542,636 A | 11/1970 | Wandel |
| 3,565,251 A | 2/1971 | Pennington |
| 3,574,103 A | 4/1971 | Latkin |
| 3,655,060 A | 4/1972 | Hagdahl |
| 3,679,057 A | 7/1972 | Perez |
| 3,716,138 A | 2/1973 | Lumsden |
| 3,747,770 A | 7/1973 | Zentia |
| 3,747,772 A | 7/1973 | Brown |
| 3,789,498 A | 2/1974 | Cole |
| 3,793,692 A * | 2/1974 | Tate et al. ................. 29/896.62 |
| 3,833,120 A | 9/1974 | Ogata |
| 3,853,529 A | 12/1974 | Boothe et al. |
| 3,900,628 A | 8/1975 | Stewart |
| 3,929,642 A | 12/1975 | Ennis et al. |
| 3,970,549 A | 7/1976 | Ennis et al. |
| 4,019,987 A | 4/1977 | Krasnow |
| 4,022,596 A | 5/1977 | Pedersen |
| 4,033,865 A | 7/1977 | Derrick, Jr. |
| 4,062,769 A | 12/1977 | Simonson |
| 4,065,382 A | 12/1977 | Derrick, Jr. |
| 4,075,106 A | 2/1978 | Yamazaki |
| 4,138,303 A | 2/1979 | Taylor |
| 4,190,527 A | 2/1980 | Spiller |
| 4,380,494 A | 4/1983 | Wilson |
| 4,410,427 A | 10/1983 | Wydeven |
| 4,464,242 A | 8/1984 | Boulton |
| 4,472,473 A | 9/1984 | Davis et al. |
| 4,546,783 A | 10/1985 | Lott |
| 4,548,213 A * | 10/1985 | Phillips et al. ................. 460/90 |
| 4,575,421 A | 3/1986 | Derrick et al. |
| 4,582,597 A | 4/1986 | Huber |
| 4,589,983 A | 5/1986 | Wydevan |
| 4,617,122 A | 10/1986 | Kruse et al. |
| 4,634,535 A | 1/1987 | Lott |
| 4,678,578 A | 7/1987 | Nodes et al. |
| 4,696,751 A | 9/1987 | Eifling |
| 4,728,422 A | 3/1988 | Bailey |
| 4,758,333 A | 7/1988 | Masica et al. |
| 4,769,968 A | 9/1988 | Davis et al. |
| 4,819,809 A | 4/1989 | Derrick |
| 4,820,407 A | 4/1989 | Lilie |

| Patent | Date | Inventor |
|---|---|---|
| 4,832,834 A | 5/1989 | Baird, Jr. |
| 4,857,176 A | 8/1989 | Derrick et al. |
| 4,882,044 A | 11/1989 | Freissle |
| 4,882,054 A | 11/1989 | Derrick et al. |
| 4,892,767 A | 1/1990 | Freissle |
| 4,940,500 A | 7/1990 | Tadokoro et al. |
| 4,954,249 A | 9/1990 | Gero et al. |
| 5,028,474 A | 7/1991 | Czaplicki |
| 5,056,286 A | 10/1991 | Bokor |
| 5,084,178 A | 1/1992 | Miller et al. |
| 5,137,622 A | 8/1992 | Souter |
| 5,139,154 A | 8/1992 | Gero et al. |
| 5,162,143 A | 11/1992 | Porter et al. |
| 5,167,740 A | 12/1992 | Michaelis et al. |
| 5,211,291 A | 5/1993 | Kelley et al. |
| 5,221,008 A | 6/1993 | Derrick, Jr. et al. |
| 5,256,292 A | 10/1993 | Cagle |
| 5,312,508 A | 5/1994 | Chisholm |
| 5,330,057 A | 7/1994 | Schiller et al. |
| 5,363,970 A * | 11/1994 | Freissle ................... 209/399 |
| 5,385,669 A | 1/1995 | Leone, Sr. |
| 5,392,925 A | 2/1995 | Seyffert |
| 5,417,793 A | 5/1995 | Bakula |
| 5,417,858 A | 5/1995 | Derrick et al. |
| 5,417,859 A | 5/1995 | Bakula |
| H1481 H | 9/1995 | Ray |
| 5,490,598 A | 2/1996 | Adams |
| 5,614,094 A | 3/1997 | Deister et al. |
| 5,636,749 A | 6/1997 | Wojciechowski |
| 5,720,881 A | 2/1998 | Derrick et al. |
| 5,783,077 A | 7/1998 | Bakula |
| 5,814,218 A | 9/1998 | Cagle |
| 5,851,393 A | 12/1998 | Carr et al. |
| 5,868,929 A | 2/1999 | Derrick et al. |
| 5,876,552 A | 3/1999 | Bakula |
| 5,921,399 A | 7/1999 | Bakula et al. |
| 5,944,993 A | 8/1999 | Derrick et al. |
| 5,950,841 A | 9/1999 | Knox et al. |
| 5,958,236 A | 9/1999 | Bakula |
| 5,967,336 A * | 10/1999 | Baltzer et al. ............ 209/403 |
| 5,984,107 A | 11/1999 | Bleh |
| 5,992,641 A | 11/1999 | Caldwell, Jr. |
| 6,000,556 A | 12/1999 | Bakula |
| 6,000,558 A | 12/1999 | Proulx et al. |
| 6,006,923 A | 12/1999 | Helmy et al. |
| 6,019,228 A | 2/2000 | Duggan |
| 6,053,331 A | 4/2000 | Cravello |
| 6,053,332 A | 4/2000 | Bakula |
| 6,269,954 B1 * | 8/2001 | Baltzer .................... 209/405 |
| 6,325,216 B1 * | 12/2001 | Seyffert et al. ........... 209/408 |
| 6,439,392 B1 * | 8/2002 | Baltzer .................... 209/405 |
| 6,484,885 B1 * | 11/2002 | Lilie et al. ................ 209/399 |
| 6,672,460 B2 * | 1/2004 | Baltzer et al. ............ 209/403 |
| 2003/0150781 A1 * | 8/2003 | Forrest .................... 209/405 |
| 2004/0074818 A1 * | 4/2004 | Burnett .................... 209/405 |

FOREIGN PATENT DOCUMENTS

| | | | |
|---|---|---|---|
| DE | 3827259 A | 4/1989 | |
| DE | 894477 U | 11/1989 | |
| GB | 19351 | of 1895 | ............ 209/397 |
| GB | 269877 | 4/1928 | ............ 8794/27 |
| IT | 361049 | 7/1938 | ............ 209/397 |
| WO | WO 9200133 A | 1/1992 | |
| WO | WO 9415723 A | 7/1994 | |
| WO | WO 9611070 A | 4/1996 | |
| WO | WO 9703765 A | 2/1997 | |
| WO | WO 9523655 A | 9/1998 | |

OTHER PUBLICATIONS

An Innovative Method of ranking Shale Shaker Screens, STCOS, Shale Shaker Technology Conference, Feb. 1991.

* cited by examiner

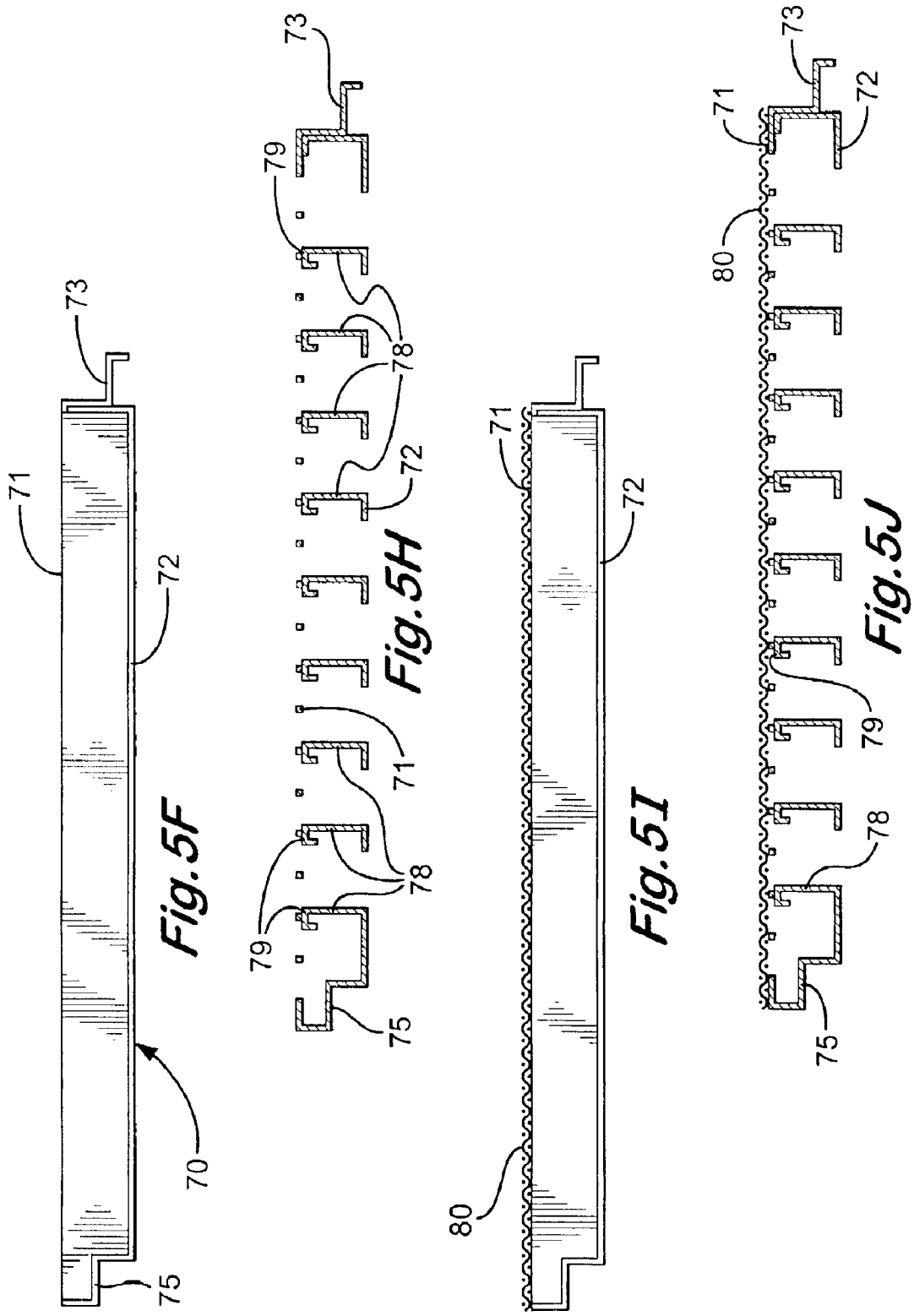

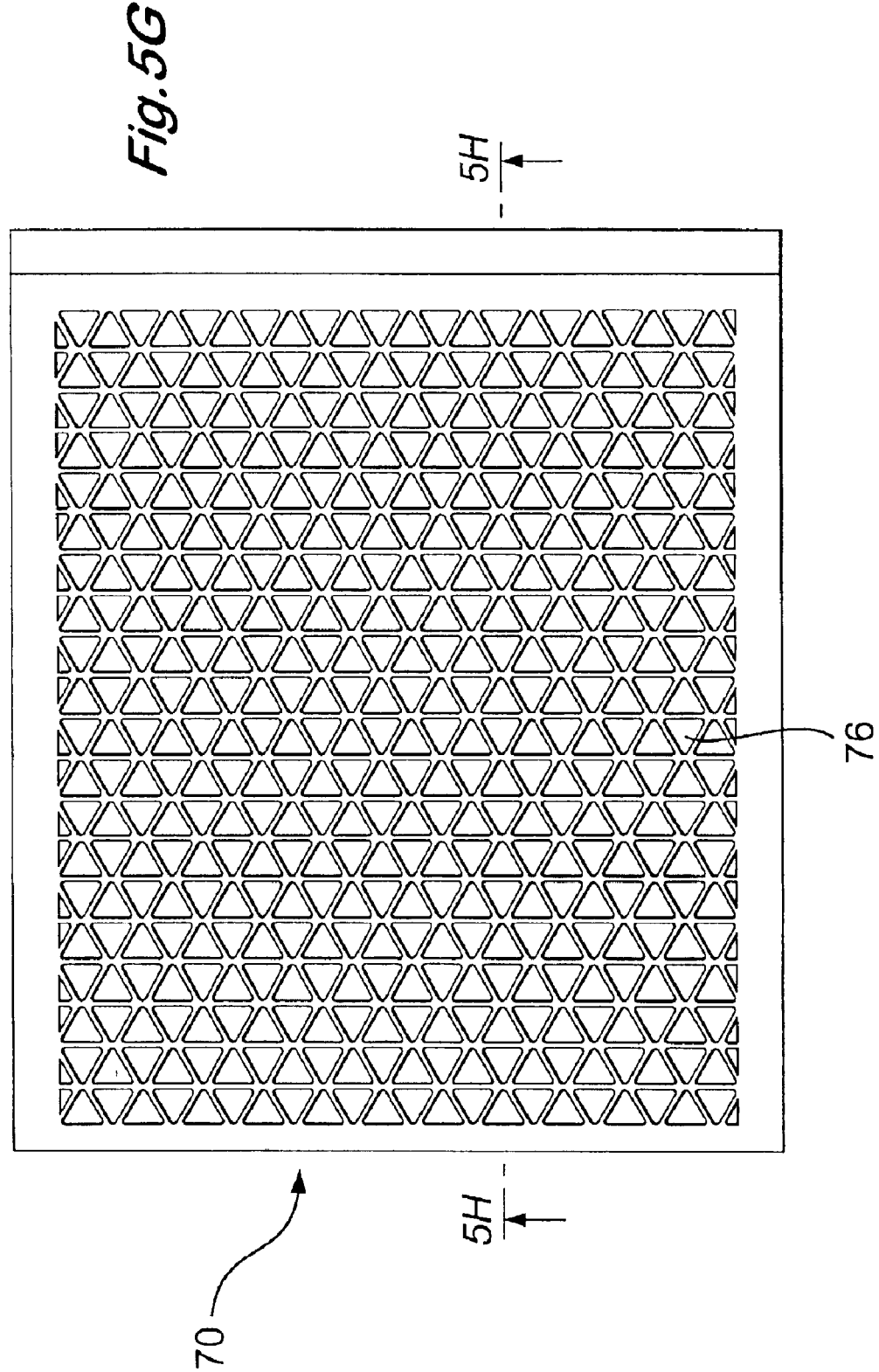

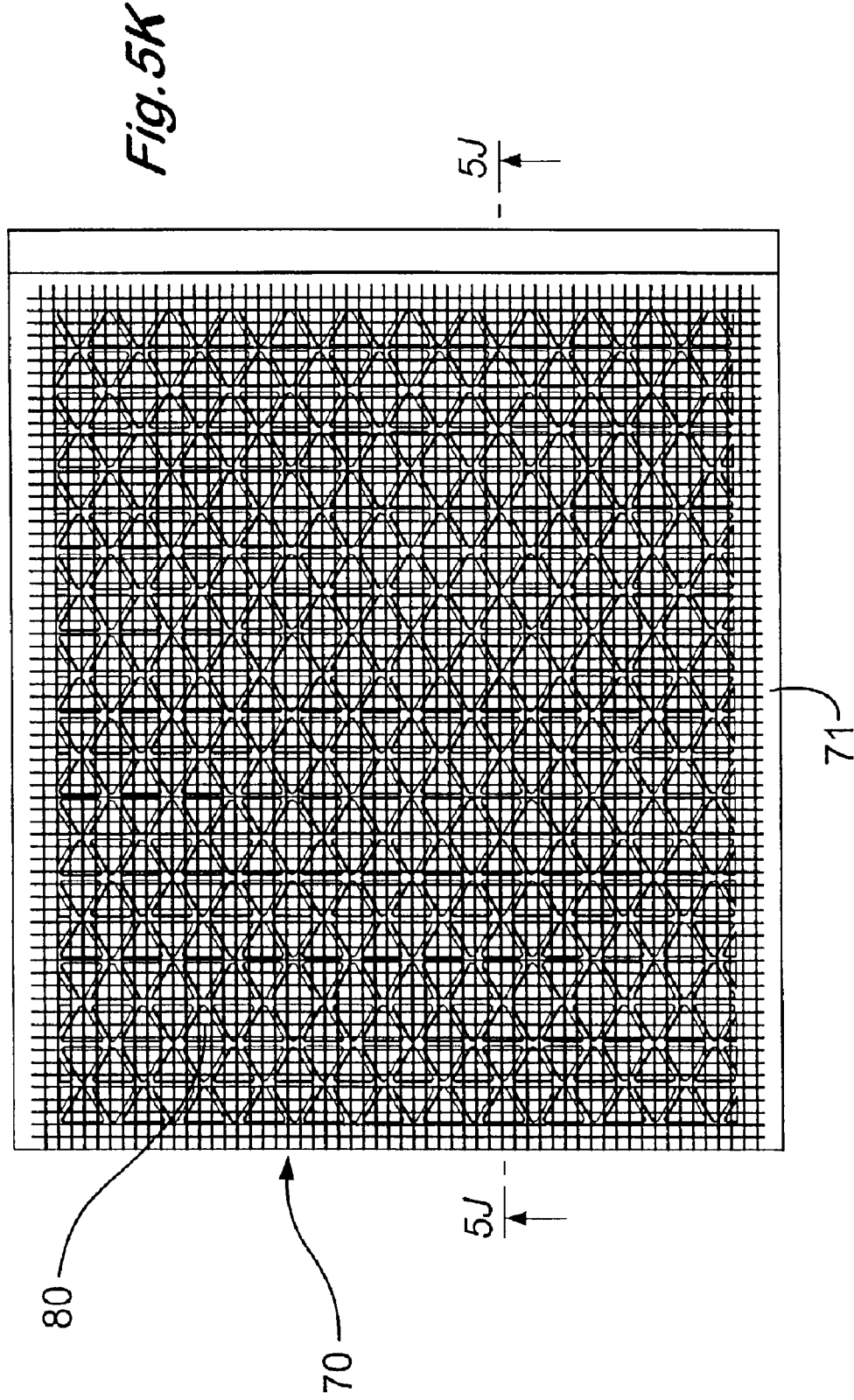

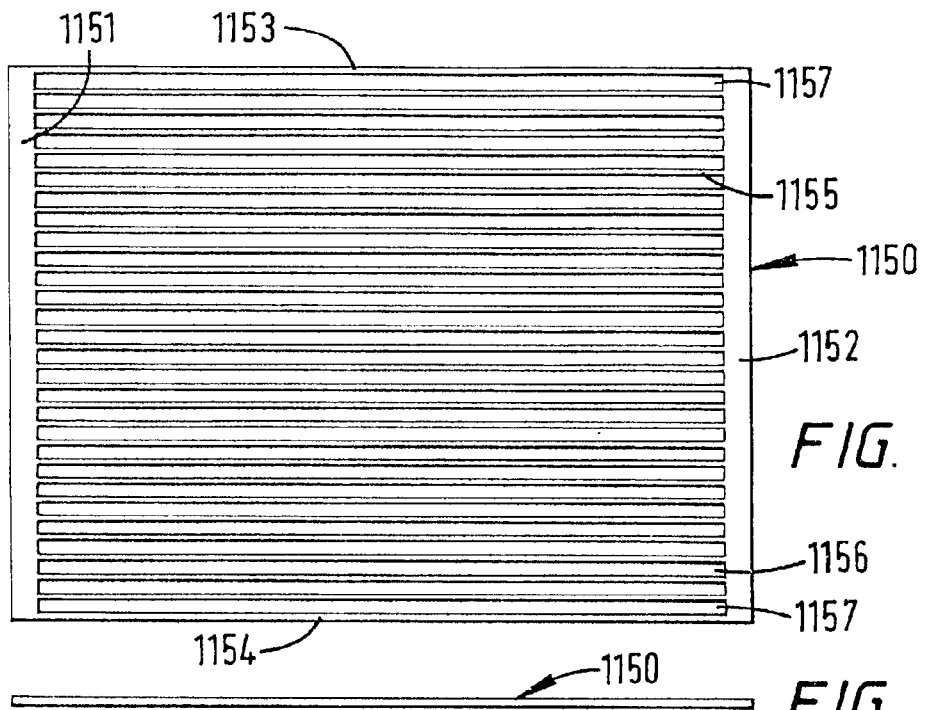
FIG. 6A
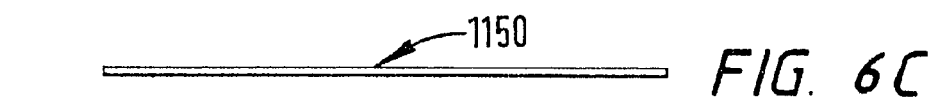
FIG. 6B
FIG. 6C
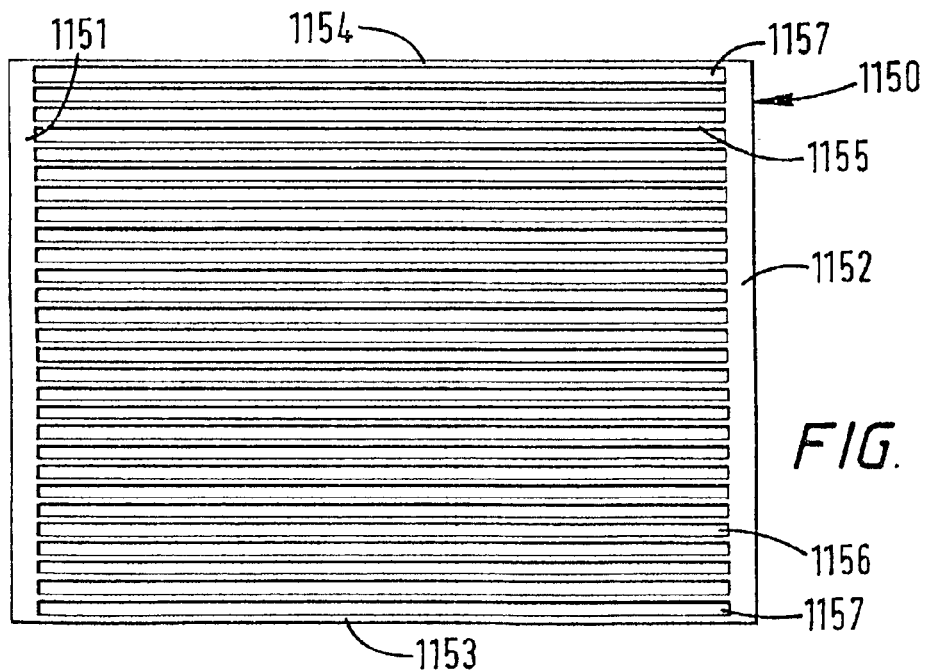
FIG. 6D

SCREEN WITH UNIBODY STRUCTURE

RELATED APPLICATIONS

This is a division of U.S. application Ser. No. 09/834,174 filed Apr. 12, 2001 now U.S. Pat. No. 6,530,483 which is a division of Ser. No. 09/544,572 filed Apr. 6, 2000 (issued as U.S. Pat. No. 6,283,302 on Sep. 4, 2001) which is a continuation-in-part of U.S. application Ser. No. 09/228,572 filed Jan. 11, 1999 (issued as U.S. Pat. No. 6,152,307 on Nov. 28, 2000) which is a continuation-in-part of U.S. application Ser. No. 09/183,005 filed Oct. 30, 1998 now abandoned, which is a continuation-in-part of U.S. application Ser. No. 09/090,554 filed Jun. 4, 1998 Now U.S. Pat. No. 6,267,247 issued Jul. 31, 2001 entitled "Vibratory Separator Screen" which is a continuation-in-part of U.S. application Ser. No. 08/895,976 filed Jul. 17, 1997 entitled "Screen For Vibratory Shaker" issued as U.S. Pat. No. 5,988,397 on Nov. 23, 1999 which is a continuation-in-part of U.S. application Ser. No. 08/786,515 filed Jan. 21, 1997 entitled "Screen For Shale Shaker" issued as U.S. Pat. No. 5,971,159 on Oct. 26, 1999 and of U.S. application Ser. No. 08/598,566 filed Feb. 12, 1996 entitled "Screen For Vibrating Separator now abandoned." U.S. application Ser. No. 08/786,515 (U.S. Pat. No. 5,971,159) is a continuation in part of the following co-owned applications and patents: U.S. Ser. No. 29/048,575 filed Jan. 4, 1996, now U.S. Pat. No. D 377,656 issued Jan. 28, 1997 which is a continuation of U.S. Ser. No. 29/014,571, now U.S. Pat. No. D 366,040 issued on Jan. 9, 1996 which is a continuation-in-part of U.S. application Ser. No. 08/056,123 filed Apr. 30, 1993, now U.S. Pat. No. 5,385,669 issued on Jan 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995 entitled "Shale Shaker Screen" issued as U.S. Pat. No. 5,598,930 in Feb. 4, 1997; U.S. Ser. No. 08/598,566 filed Feb. 12, 1996 entitled "Screen For Vibrating Separator" (abandoned) which is a continuation-in-part of U.S. Ser. No. 08/220,101 filed Mar. 30, 1994 now U.S. Pat. No. 5,490,598 issued Feb. 13, 1996. All of these related applications and patents are incorporated herein in their entirety for all purposes.

BACKGROUND OF THE INVENTION

1. Field Of The Invention

The present invention is directed to frames, support structures, and panels for screens for vibratory shakers, screens with such a frame support, or panel, and methods of their use.

2. Description of Related Art

The prior art discloses a wide variety of vibrating screens, devices which use them, shale shakers, and screens for shale shakers and vibratory separators. The screens catch and remove entrained solids from fluid, drilling fluid, and/or drilling mud as it passes through them.

Various prior art screens have one, two or more overlying layers of screening material, mesh, and/or screen cloth which may be bonded together. A support, supports, or a perforated or apertured plate is often used beneath the screen, mesh or screens of many prior art screen assemblies. Also an outer frame is used in many screens. The frame may include one or more crossmembers extending across the frame and connected at the ends to sides of the frame. The frame facilitates connection of the screen to a separator device and provides support for the plate and screening material.

SUMMARY OF THE PRESENT INVENTION

The present invention discloses, in certainembodiments, a unibody structure for a screen assembly for a vibratory separator and a screen assembly with such a unibody structure, the unibody structure, in certain aspects having an integral body member with a portion having a plurality of spaced-apart openings in a pattern of a plurality of spaced-apart screening openings and including a pair of spaced-apart integral side members made of folded portions that form the pair of spaced-apart integral side members, a pair of spaced-apart integral end members made of folded end portions, the pair of spaced-apart integral end members each with a first end member and a second end member, the first end member configured with a shoulder support portion for sealingly abutting a screen ledge end of an adjacent screen, and the second end member configured with a ledge portion for sealingly abutting a shoulder portion of an end of an adjacent screen, and the plurality of spaced-apart openings of the integral body member defined by a plurality of spaced-apart strips, each adjacent pair of the plurality of spaced-apart strips defining a space through the integral body member and having a length and independent of and not connected to the other strips along its length. In one aspect there is screening material on the unibody structure.

The present invention discloses, in certain embodiments, a unibody structure for a screen for a vibratory separator and a screen assembly with such a structure. In certain aspects, the unibody structure is made from a single piece of material and a pattern of openings is made through it that perform a screening function. Such openings are, in certain aspects, defined by a series of ribs or strips independent of each other along their length also formed from the single piece of material to provide a support to screening material on top of the unibody structure. In one aspect such strips or ribs extend in only one direction across the unibody structure and are parallel to each other, but they may be at an angle to each other. Such may be used alone or it may serve as a support for mesh and/or screening material—with or without an additional screen support, an additional support plate, or an additional series of support pieces or strips. In certain aspects there are foldable or bendable portions forming hook strips and/or portions forming a shoulder or ledge end for sealing abutment of adjacent screens. In one aspect the structure is foldable or bendable to form a single large opening defined by four resulting sides of the unibody structure.

In certain embodiments, the screen with a unibody structure according to the present invention has one, two, three or more upper layers of screen, screen cloth, and/or mesh, bonded or not to the structure. If more than one layer mounted on the structure is used, they may be bonded together at discrete points, at discrete areas, or over their entire surface. The unibody structure may, in certain aspects, include one or two interconnected pairs of spaced-apart integral sides in a generally rectangular configuration. Hook strips, channels, or other mounting structure may be provided on opposed sides of a structure which are formed of either separate or integral portions of the original single piece of material.

The unibody structure may be made of any suitable plastic or metal, including, but not limited to, steel, stainless steel, aluminum, aluminum alloys, zinc, zinc alloys, PTFE, or some combination thereof. The present invention may include a shale shaker or vibratory separator with one or more screen assemblies with a unibody structure according to the present invention.

This invention may provide a screen as in U.S. Pat. Nos. 6,000,556; 5,958,236; 5,944,993; 5,876,552; 5,888,929; 5,713,077; 5,720,881; 5,673,797; 5,417,793; 5,417,858; and 5,417,859, (all fully incorporated herein) but to delete the apertured plate or frame and to use instead a unibody structure as disclosed herein.

In certain aspects according to the present invention, a single piece of material is used to form a four-sided support or frame for screening material (one, two, three or more layers) and/or for a plate or sheet with holes therethrough.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, non-obvious unibody screen frames, screen assemblies with such a frame, shale shakers and vibratory separators with such screens, and methods of their use;

Screen assemblies with a unibody structure which require no support for screening material other than the unibody structure;

A unibody structure with a plurality of openings therein that define a series or pattern of supporting members for screening material thereon; and Such a structure also including one or more support strip or rib portions or a series of a plurality of spaced-apart support strip or rib portions independent of each other along their length.

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods.

The present invention recognizes and addresses the previously-mentioned problems and long-felt needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 5F shows the piece of material with part folded or bend over onto the other part. FIG. 5G is a top view of the piece of material of FIG. 5F and FIG. 5H is a view along line 5H—5H of FIG. 5G. FIGS. 5I (side view), 5J (cross-section view along line 5J—5J of FIG. 5K) and 5K (top view), show screening material on the piece of material of FIG. 5H.

FIG. 6A is a top view of a panel according to the present invention for a screen assembly.

FIG. 6B is a front side view of the panel of FIG. 6A. The back side view is like the view of FIG. 6B.

FIG. 6C is a left end view (as in FIG. 6A) of the panel of FIG. 6A. The right end view is like the view of FIG. 6C.

FIG. 6D is a bottom view.

DESCRIPTION OF EMBODIMENTS PREFERRED AT THE TIME OF FILING FOR THIS PATENT

Figure 1A:
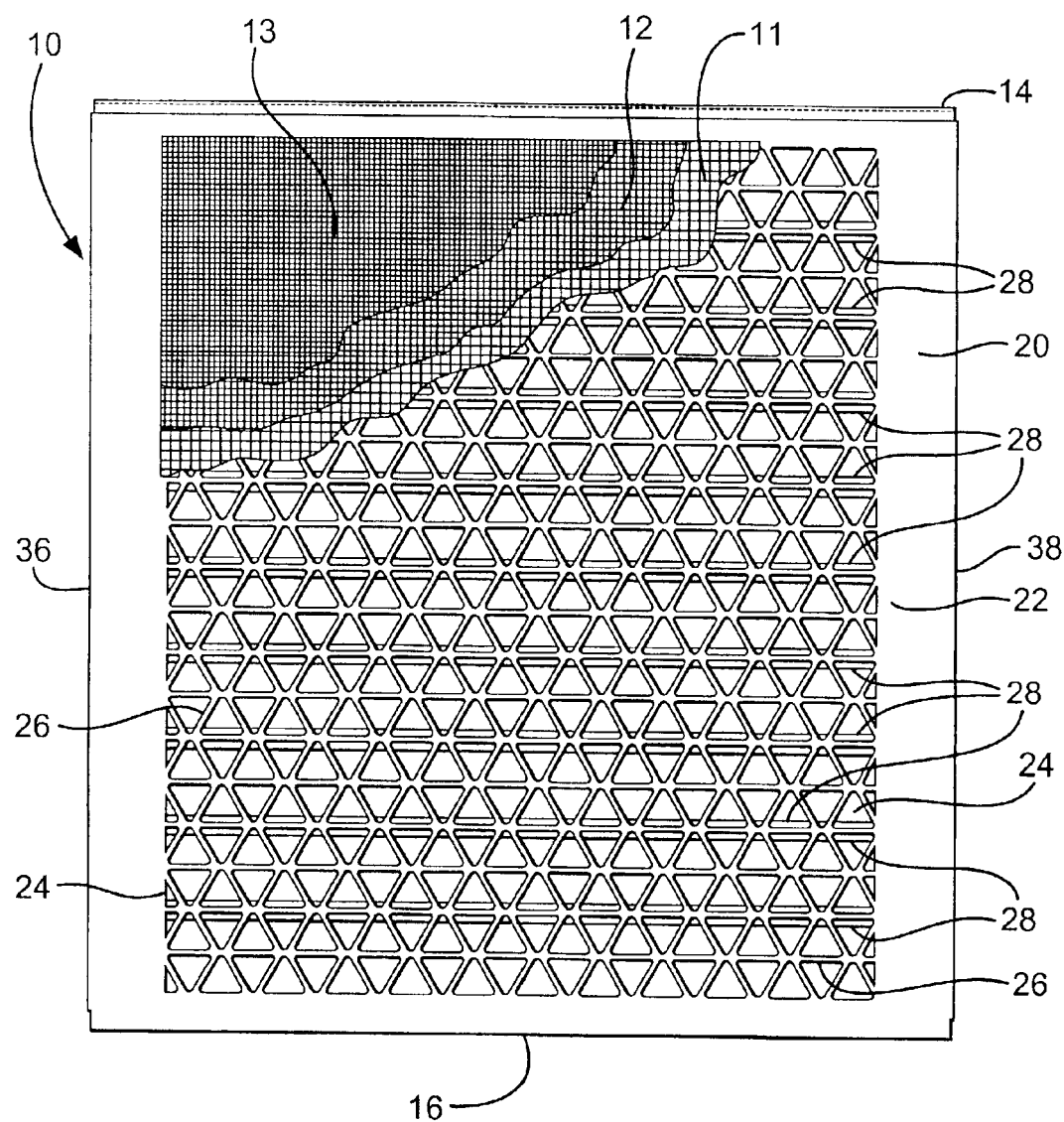
FIG. 1A is a top view of a screen assembly according to the present invention.
Figure 1B:
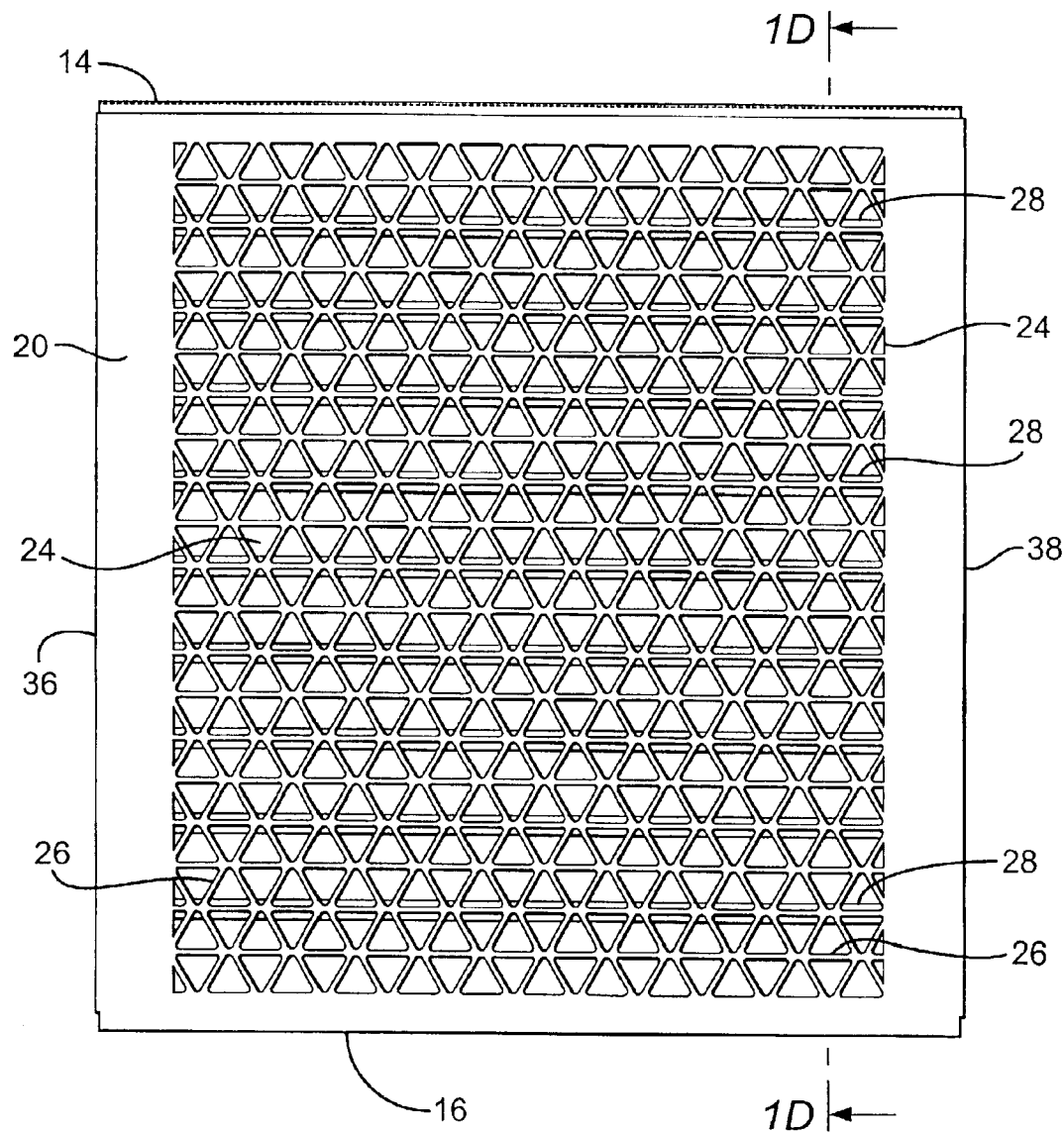
FIG. 1B is a top view of part of the screen assembly of FIG. 1A.

FIGS. 1A–1F show a screen assembly 10 according to the present invention with a unibody structure 20 according to the present invention. The screen assembly 10 has, optionally, three layers 11, 12, 13 of screening material bonded to a top surface 22 of the unibody structure 20. Preferably, the layers 11, 12, 13 are also bonded together over substantially their entire surface area.

A plurality of openings 24 through the unibody structure 20 define a plurality of support members 26. To the underside of the unibody structure 20 are, optionally, connected a plurality of spaced-apart ribs or strips 28 which, in one aspect are welded to a metal unibody structure 20. In this particular embodiment the ribs 28 are positioned along a substantial majority of their length directly beneath one of the support members 26 that extend across a major portion of the unibody structure 20; but it is within the scope of this invention to use no such ribs or to position them anywhere on the underside of the unibody structure 20. The unibody structure 20 has spaced-apart sides 36, 38.

Figure 1C:
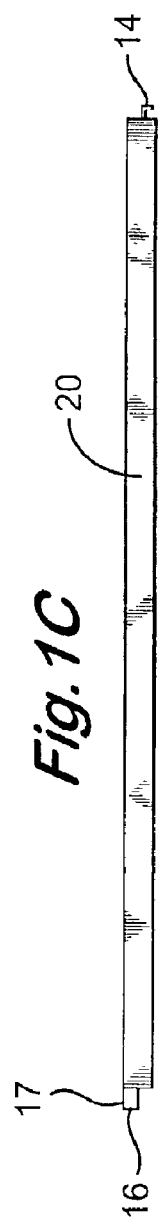
FIG. 1C is a side view of the screen assembly part shown in FIG. 1B.
Figure 1D:
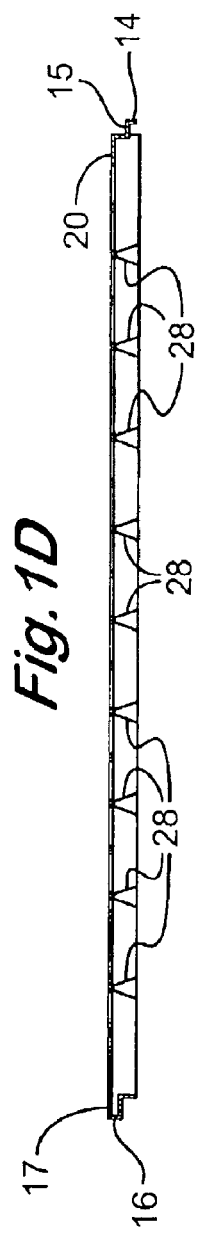
FIG. 1D is a cross-section view along line 1D—1D of FIG. 1B.
Figure 1G:
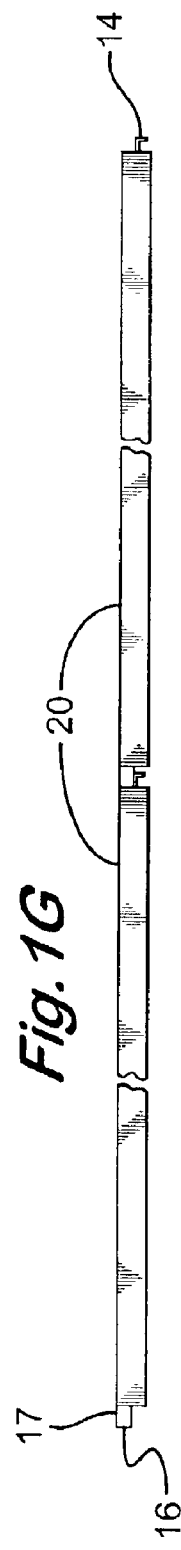
FIG. 1G shows two screens as in FIG. 1D end-to-end.

As shown in FIG. 1C, the screen assembly 10 has an end 14 and a "ledge" end 16. The ledge end has an upper ledge portion 17 that rests on a shoulder 15 of an end 14 of an adjacent screen. Thus one screen end 16 seals against another screen end 14 when such screens are used end-to-end, as shown in FIG. 1G. In one particular embodiment four screens as in FIG. 1D are used on a shaker in two end-to-end pairs with the paris side by side. Each pair is positioned in "C" channels. One of the screens is moved into the "C" channel supports ledge end 16 first. Then the ledge end 16 of the second screen is moved into the "C" channels so that it sealingly abuts the end 14 of the first screen. The other pair is similarly installed.

Figure 1E:
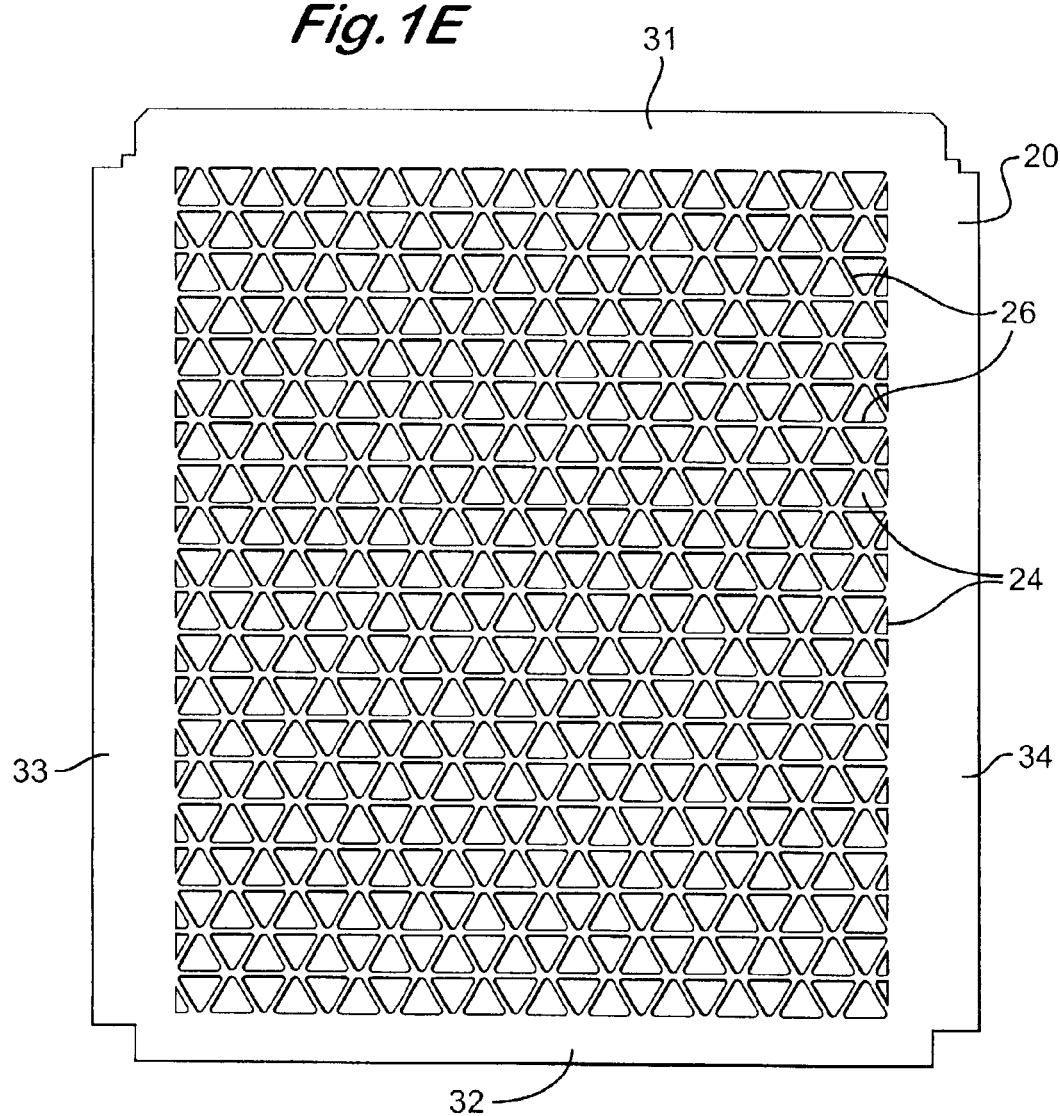
FIG. 1E is a flattened out view of the screen assembly part of FIG. 1B.

As shown in FIG. 1E, the unibody structure 20 is, initially, a single integral piece of material in which the pattern of openings 24 is formed, e.g. by any suitable cutting tool, punch, laser, or plasma beam or arc. Alternatively, the area shown in FIG. 1E with the openings 24 may be removed so that all that is formed according to the present invention is a four-sided structure to which is applied one, two, three or more layers of screening sheet(s) and/or screening material; including but not limited to a perforated sheet or plate and/or any desired number of layers of screening material, bonded or unbonded.

Figure 1F:
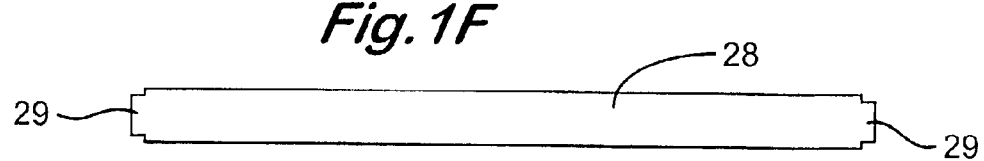
FIG. 1F is a flattened out view of part of the screen assembly of FIG. 1A.

Extensions 31, 32, 33, and 34 are folded to form, respectively, the end, 14, end 16 and sides 36, 38. It is within the scope of this invention to fold the various extensions of the unibody structure with any suitable press brake, pliers, or bending device with or without applying heat to the structure. FIG. 1F shows a rib 28 which has not yet been bent or folded into the form shown in FIG. 1D. Ends 29 may be introduced into corresponding holes or slots (not shown) in the sides 36, 38 to facilitate securement of the ribs.

It is within the scope of this invention for the screen assembly 10 to have none, one, two, three or more layers of screening material, i.e., screen, mesh, and/or cloth made, e.g., of stainless steel wire and/or plastic. Any such layer or combination of layers may be bonded together (glued, welded, and/or sintered) in any known manner and/or bonded to the unibody structure 20 in any known manner. Any such layer or layers of screening material may be substantially flat or may be undulating (with a series of alternating ridges and valleys) as is well known in the art.

Figure 2:
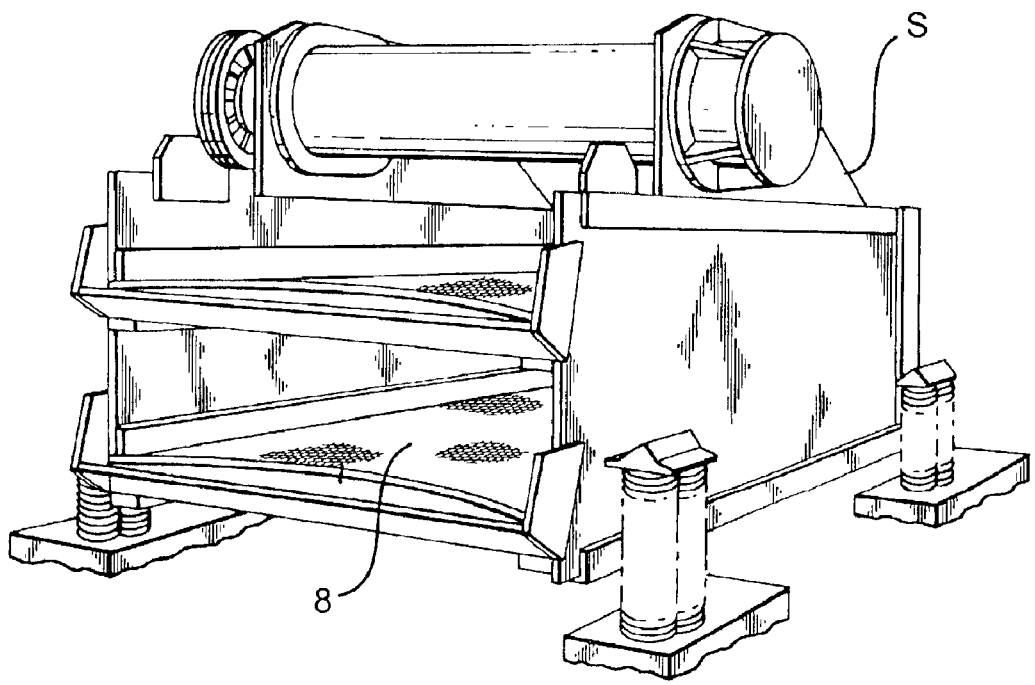
FIG. 2 is a perspective view of a shale shaker according to the present invention with a screen assembly according to the present invention.
Figure 4A:
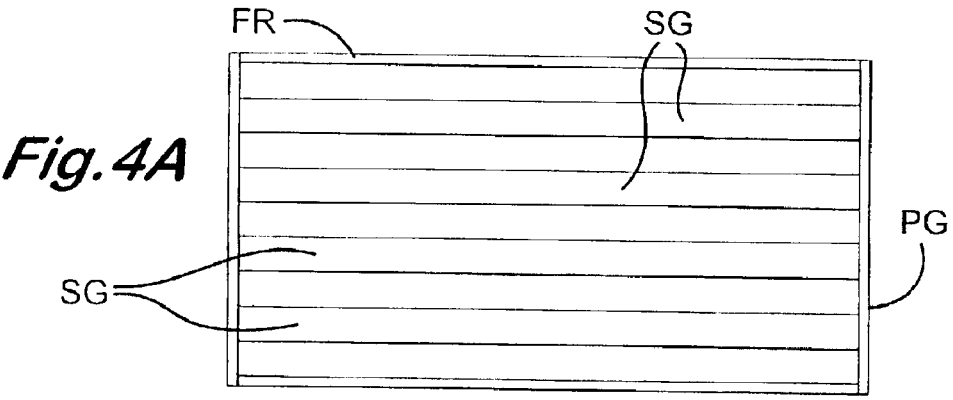
FIGS. 4A–4J are top views of patterns of openings that may be provided in a unibody frame according to the present invention.
Figure 4B:
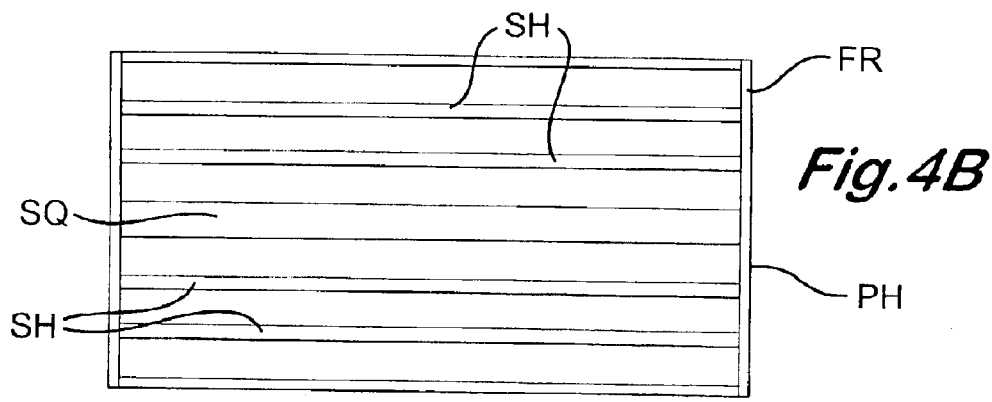

FIG. 2 shows a shale shaker S according to the present invention with a screen assembly 8 according to the present invention which may be any screen assembly disclosed herein according to the present invention. Any suitable known shaker or vibratory separator may employ one or more screens according to the present invention including but not limited to shakers as disclosed in U.S. Pat. Nos. 5,392,925 and 5,641,070 and in the references cited in each patent.

Edges on both sides of a unibody structure according to the present invention can form hook strips. In such an embodiment with hook strips a hook end (like the hook end 14), FIG. 1C) and/or a ledge end (like the ledge end 16, FIG. 1C) may be deleted.

FIGS. 3A–3G are top views of alternative embodiments for the unibody structure F, each with a series of different-shaped openings 41, 42, 43, 44, 45, 46, 47 therethrough, respectively. Instead of placing sheets or layers of screening material over the openings, it is within the scope of this invention to emplace a plug or module with screening material in some or all of the openings of any screen assembly disclosed herein according to the present invention. In certain aspects, the plugs or modules are as disclosed in U.S. Pat. Nos. 5,988,397 or 5,490,598, parents of this case.

Figure 3A:
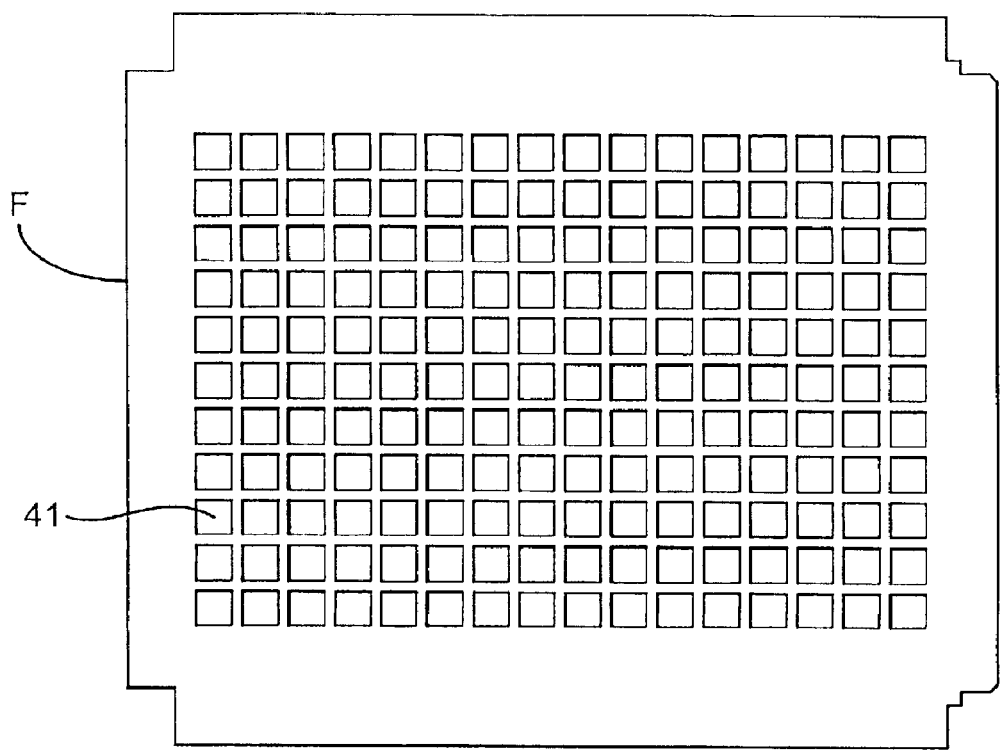
FIGS. 3A–3G are top views of alternative embodiments for a part like the part of FIG. 1B of a screen assembly according to the present invention.
Figure 3B:
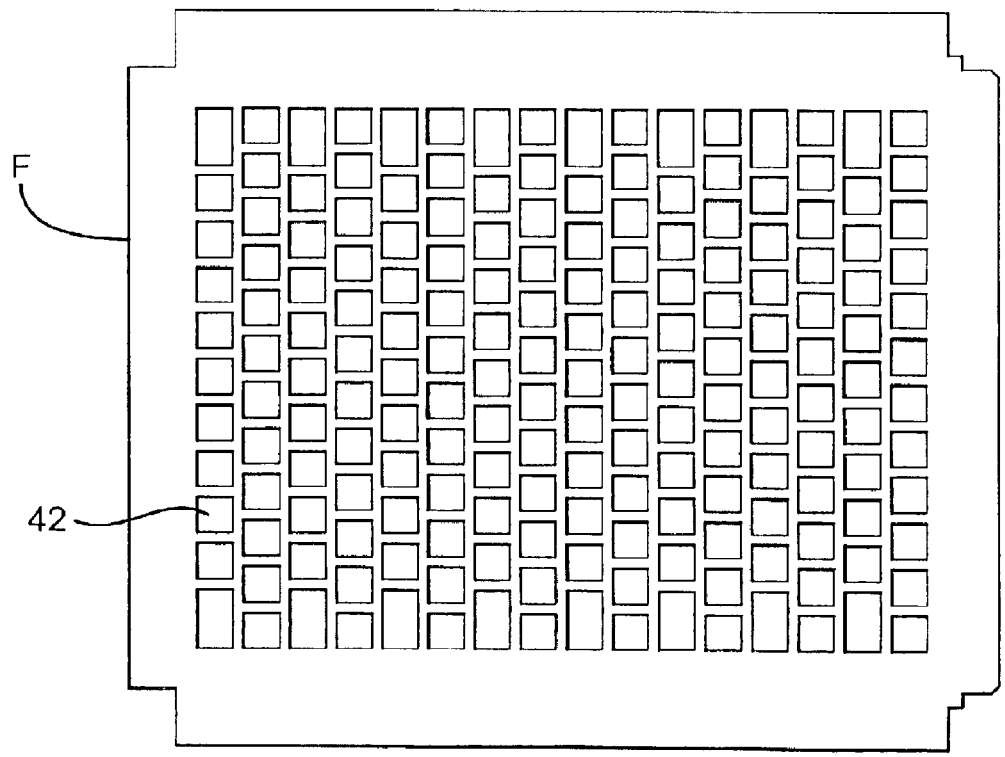
Figure 3C:
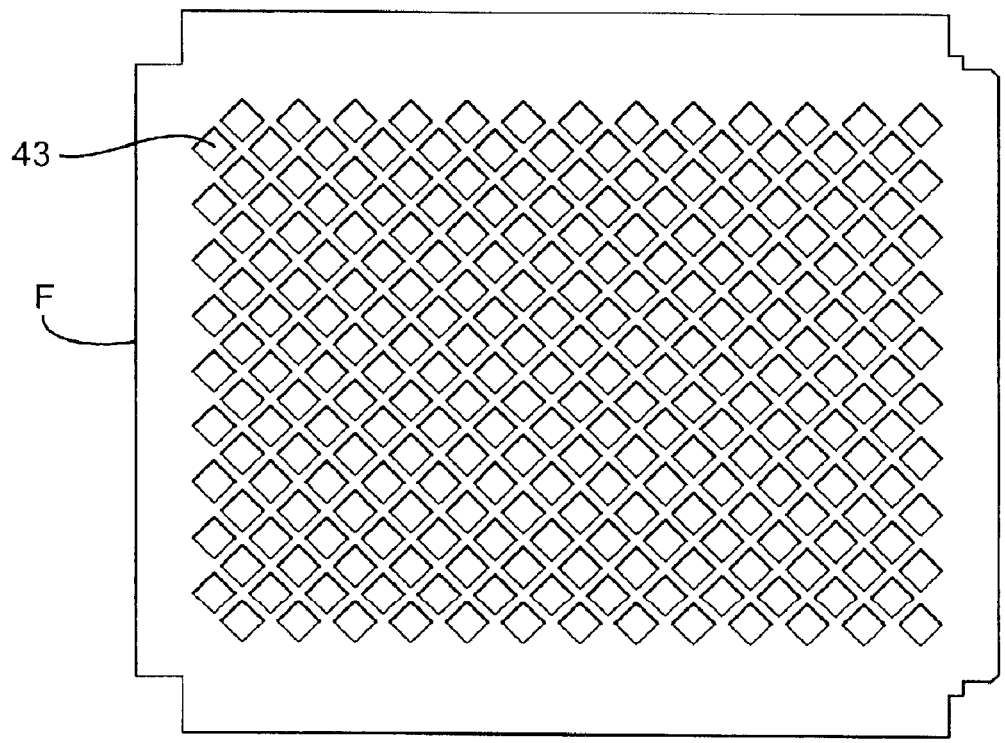
Figure 3D:
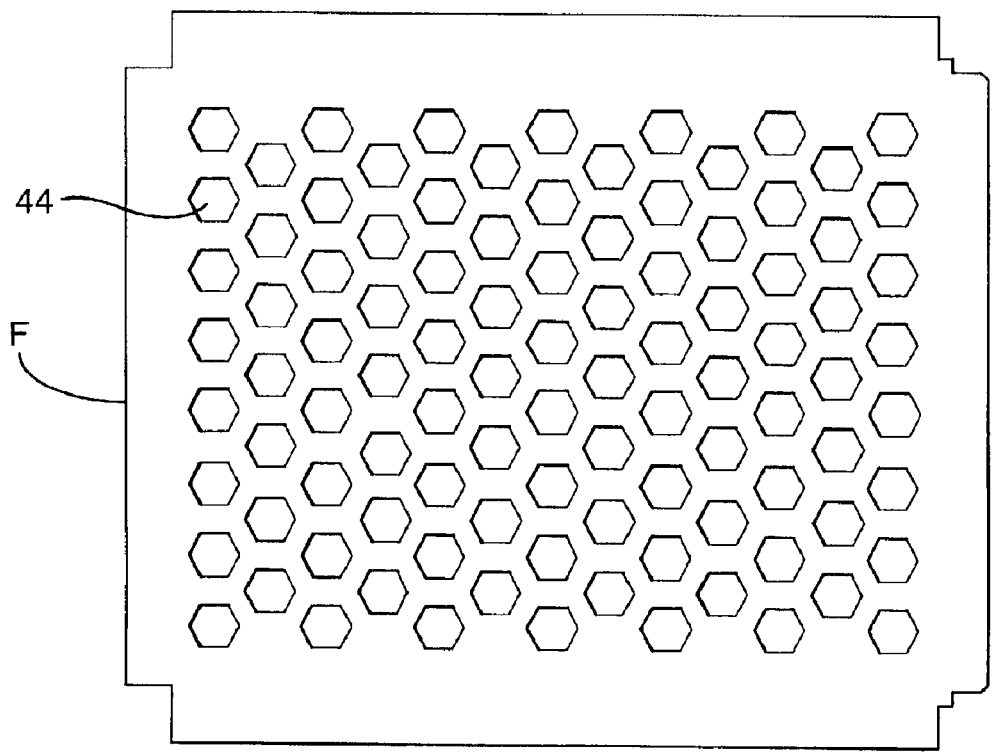
Figure 3E:
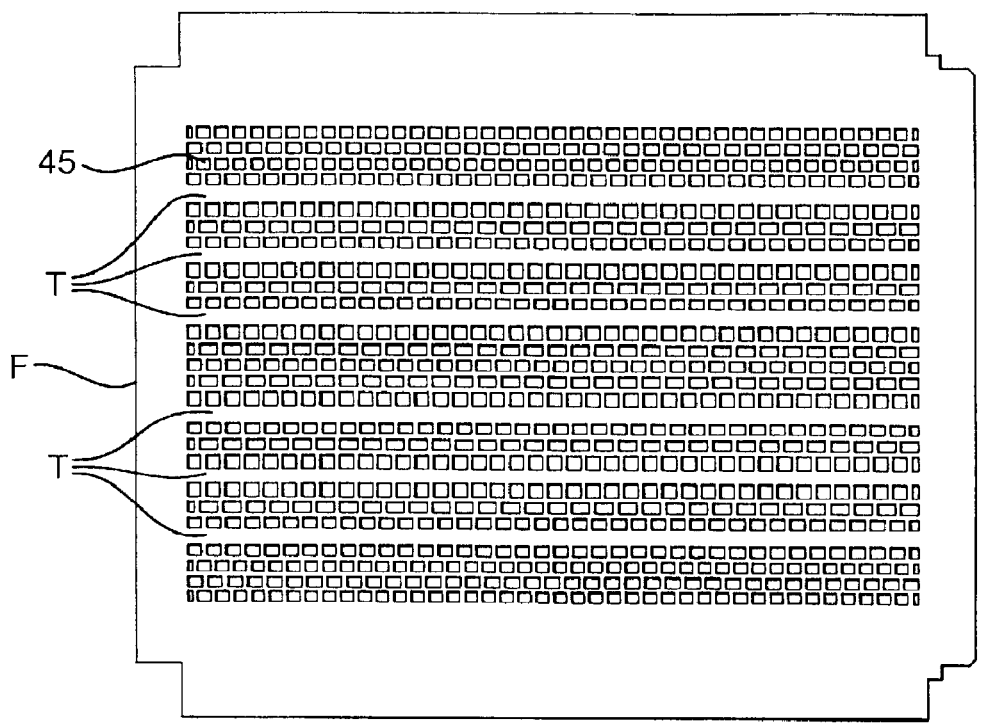
Figure 3F:
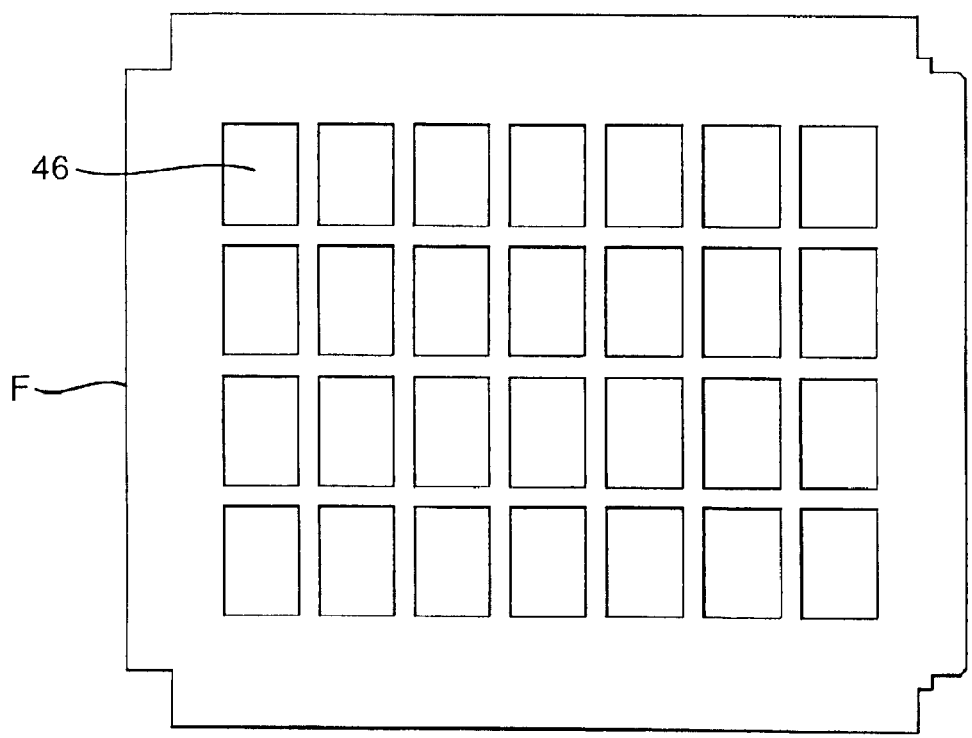
Figure 3G:
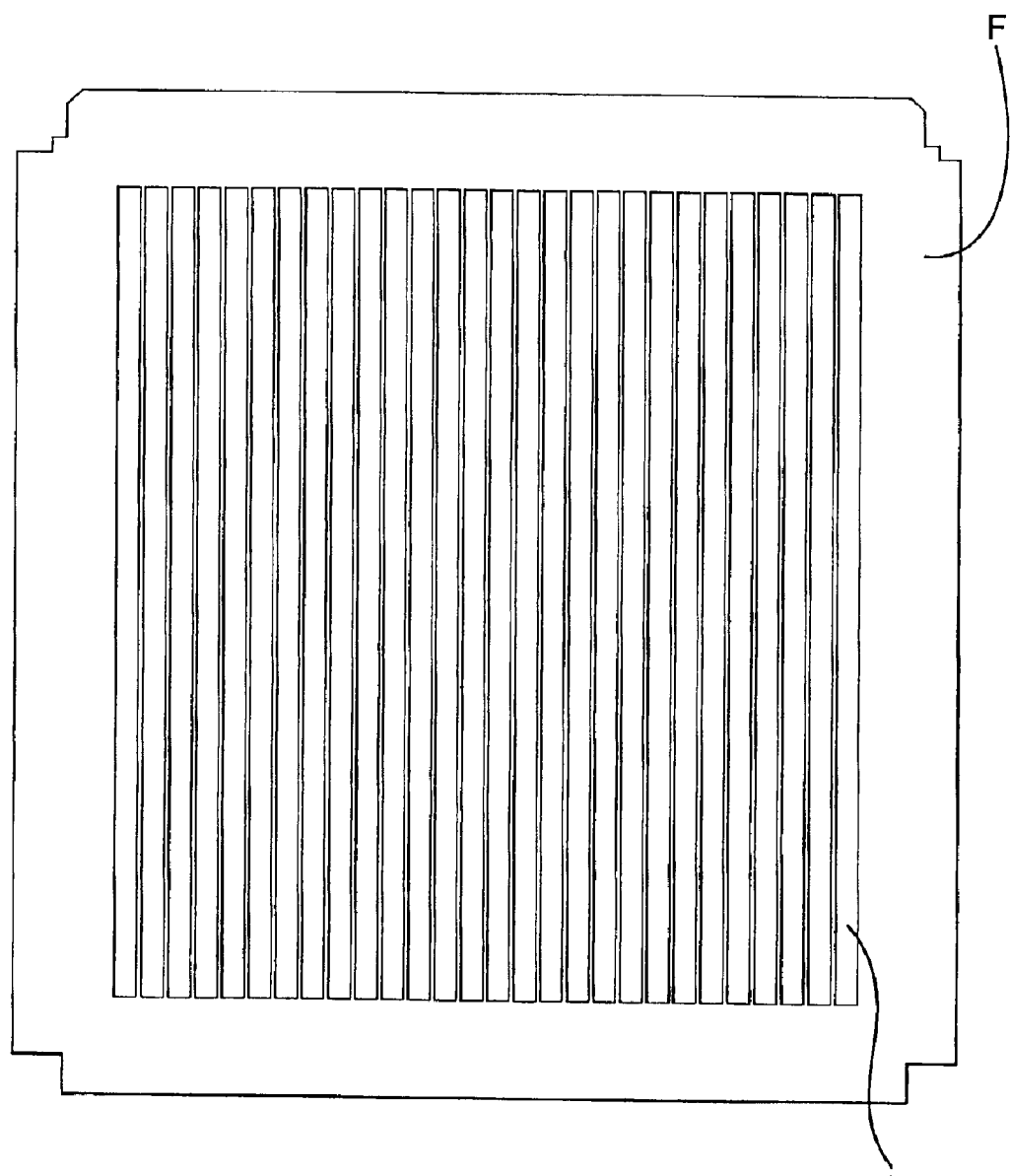
Figure 4C:
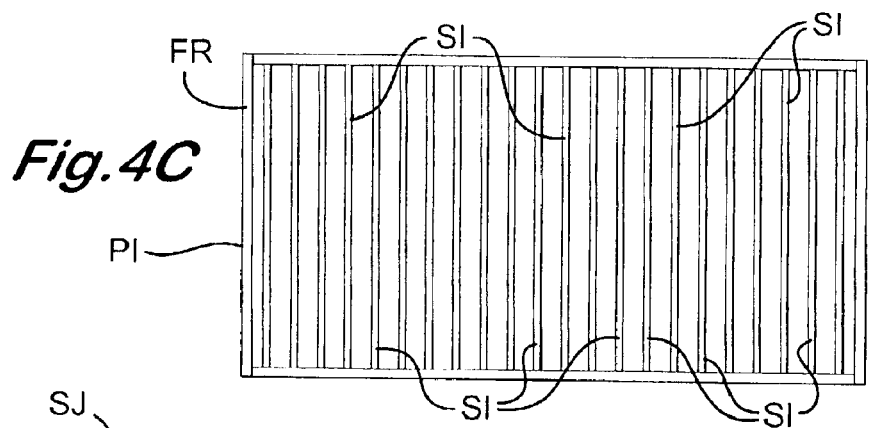
Figure 4D:
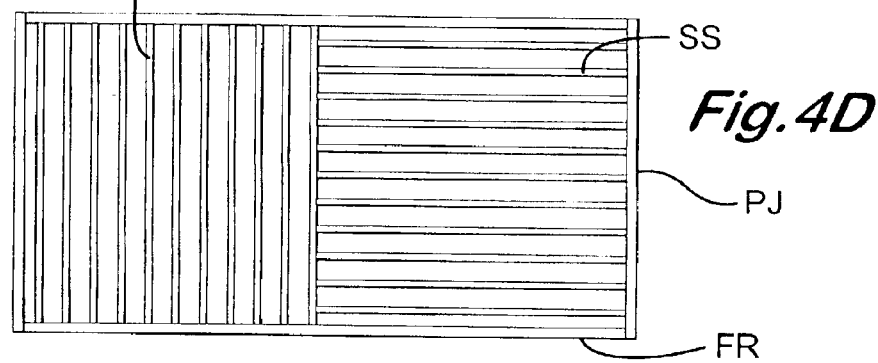
Figure 4E:
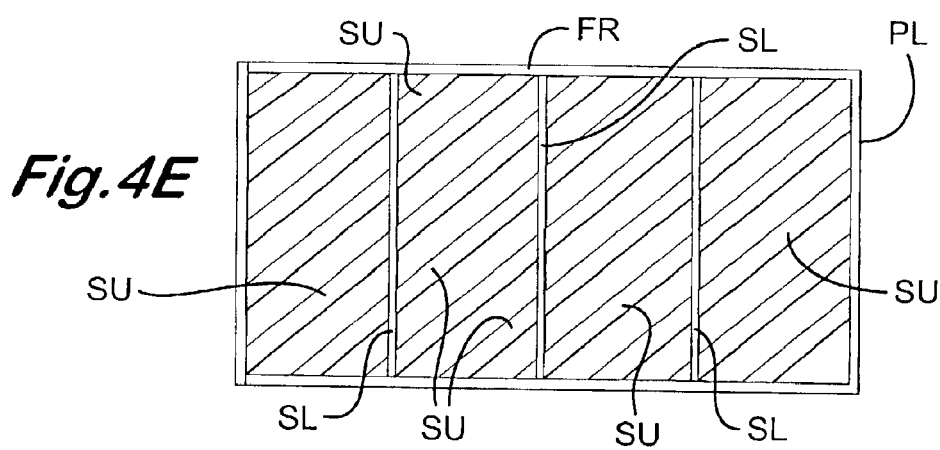
Figure 4F:
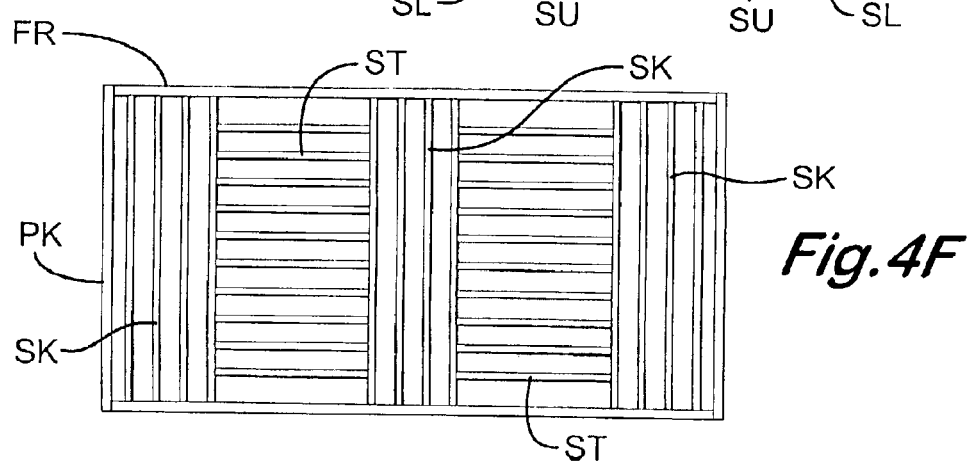
Figure 4G:
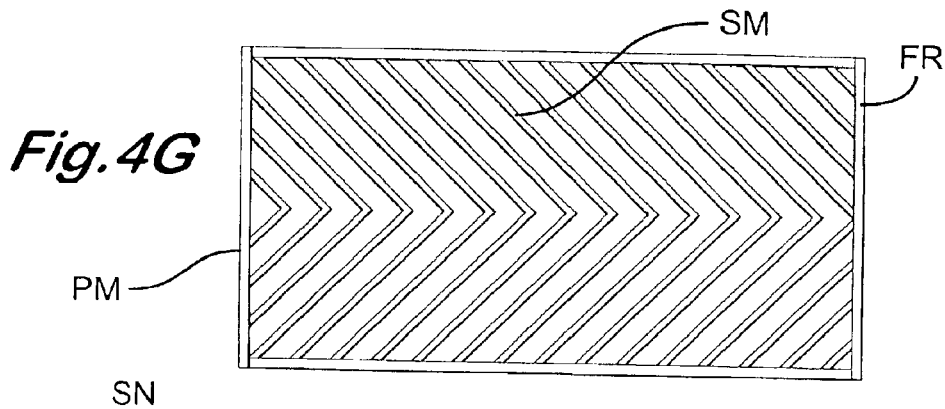
Figure 4H:
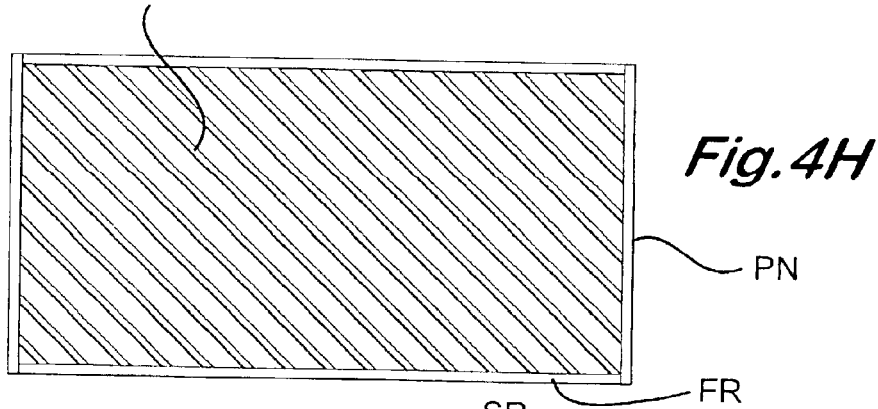
Figure 4I:
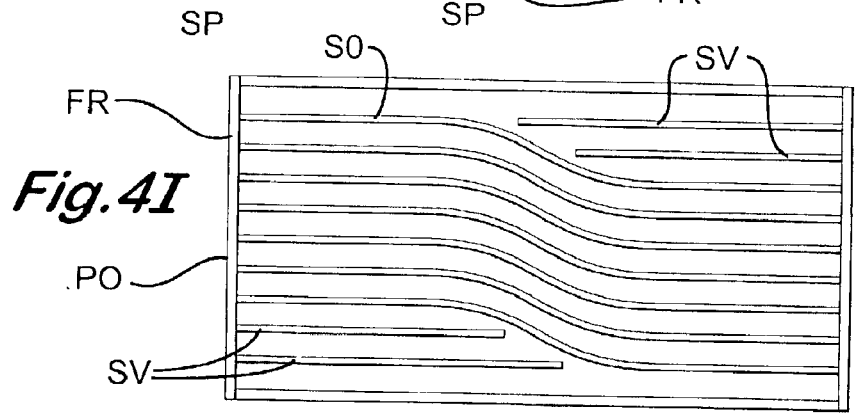
Figure 4J:
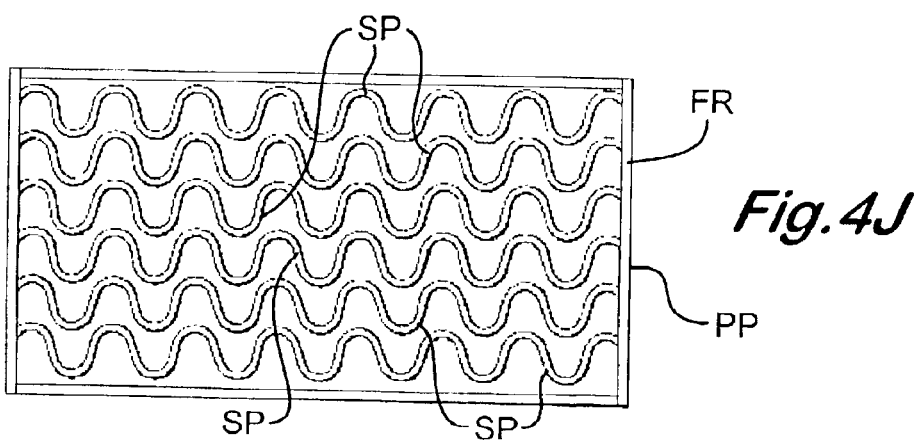

Also, e.g. as shown in the embodiment of FIG. 3E, it is within the scope of this invention to provide one or more areas or strips T without openings.

FIGS. 4A–4J replicate the panels disclosed in FIGS. 45G–45P of pending U.S. application Ser. No. 288,572, filed Jan. 11, 1999, a parent of this case, and are reproduced here to illustrate certain possible opening/support member patterns for a unibody structure according to the present invention. Of course if any such opening/support pattern is used in a unibody structure according to the present invention the ends and sides of the panels as disclosed in FIGS. 45G–45P of the cited application may be deleted.

In certain embodiments of a screen assembly with a unibody structure according to the present invention as described above has no separate pieces added to form parts, e.g. sides, hook strips, hook end, ledge end, etc. and is, therefore, relatively less expensive to make. By reducing or eliminating seams and connection areas, a relatively more substantial screen assembly is possible.

Figure 5A:
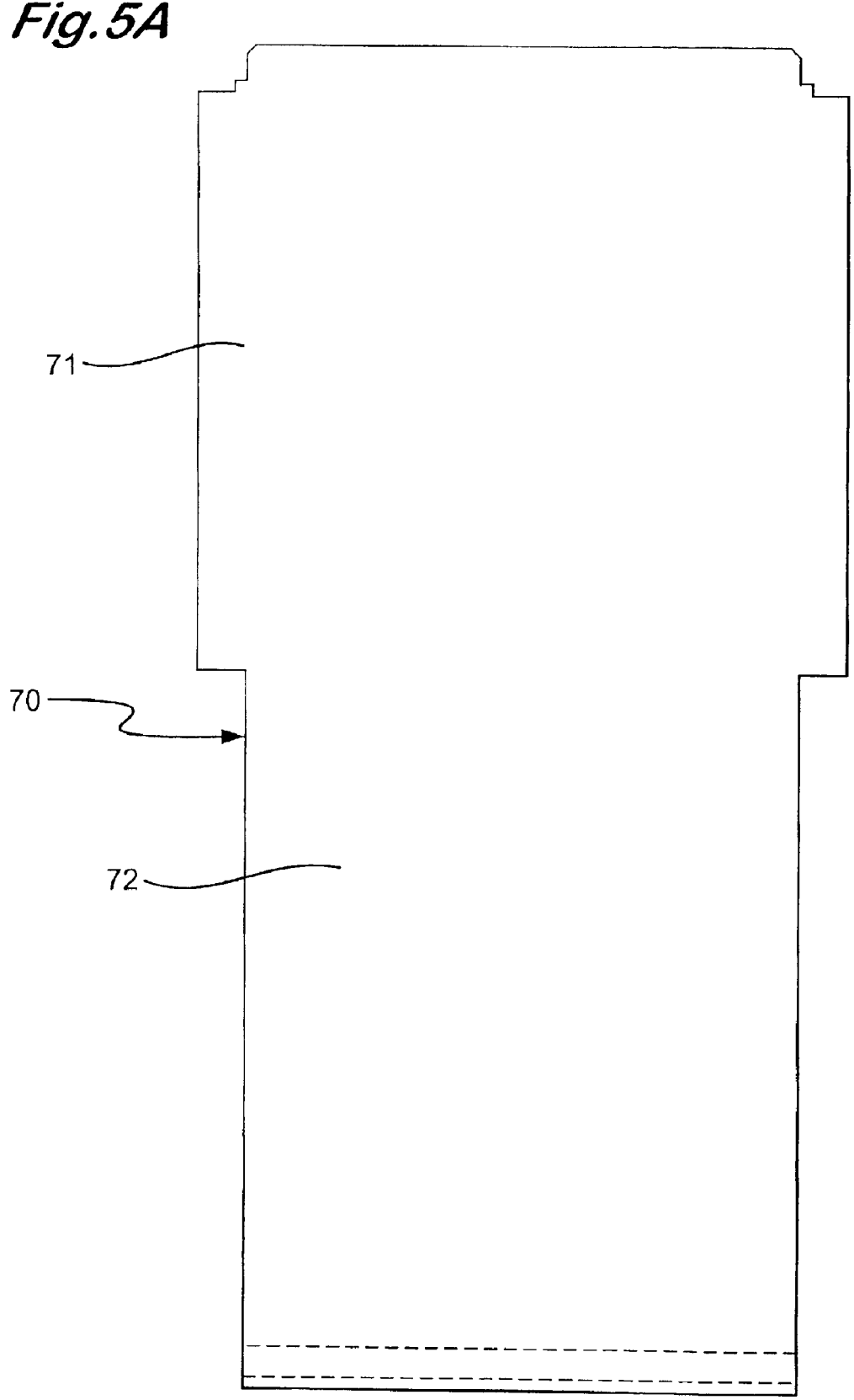
FIG. 5A is a top view of a single piece of material to be used to make a unibody structure according to the present invention.
Figure 5B:
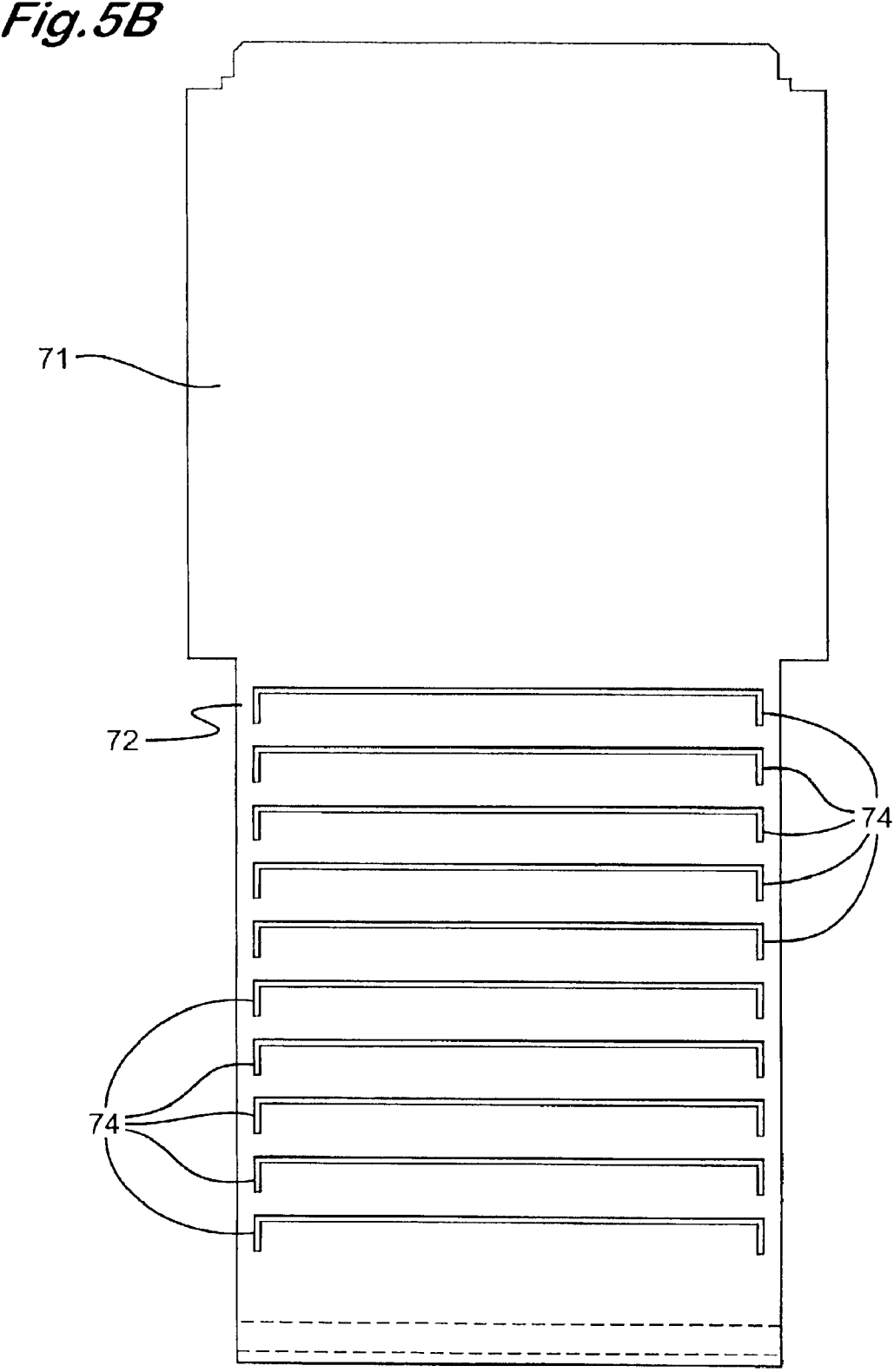
FIG. 5B shows the material of FIG. 5A with slots cut to form support ribs.

FIGS. 5A–5E illustrate a unibody structure 70 according to the present invention that is initially a single integral piece of material that is cut or machined to the shape shown in FIG. 5A that includes a first portion 71 in which will be made a pattern of openings and a second portion 72 in which will be made a series of rib supports. As shown in FIG. 5B a series of slots 74 are made (cut, drilled, punched, or machined in any suitable manner) in the second portion.

Figure 5C:
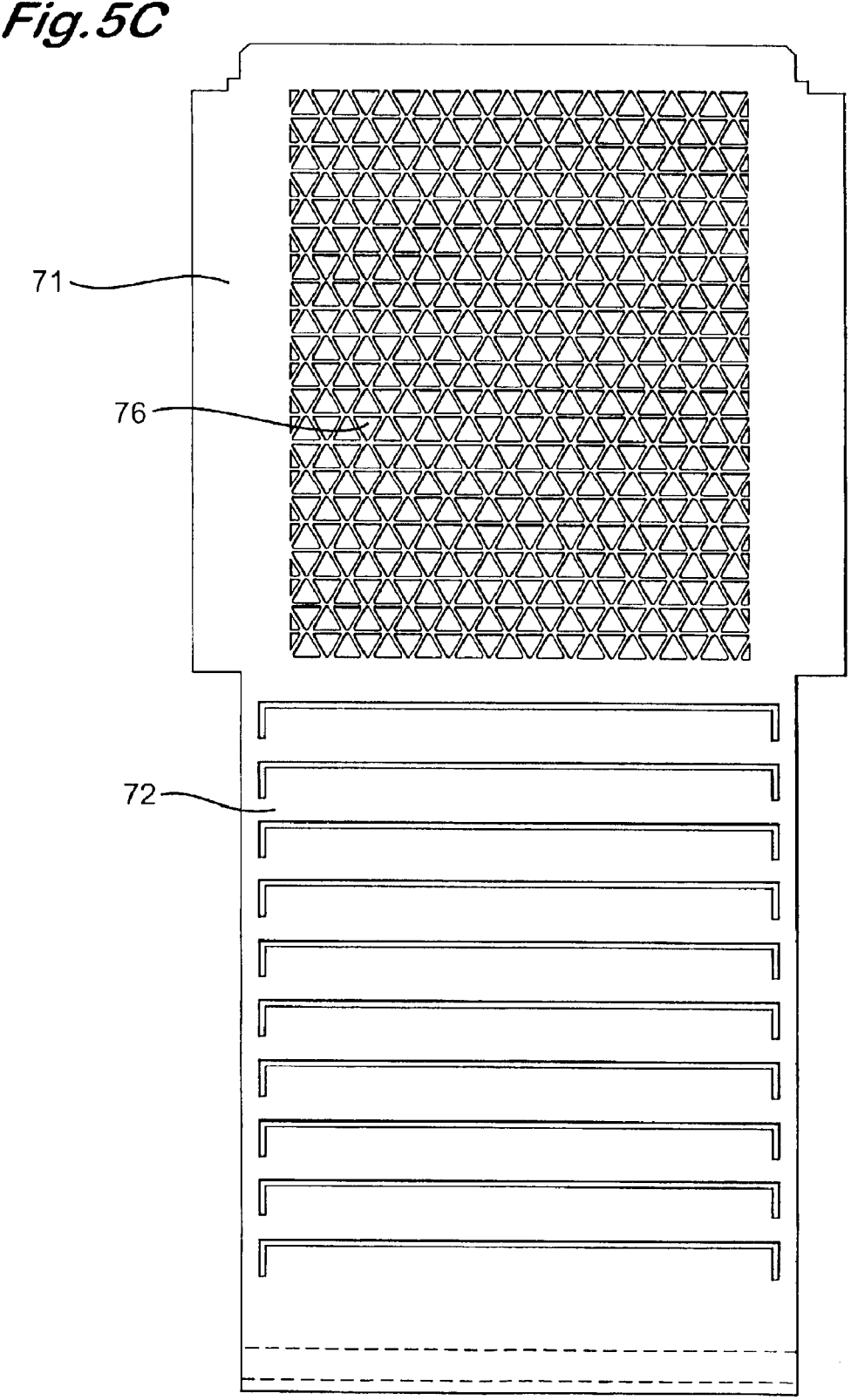
FIG. 5C shows the material of FIG. 5B with a pattern of openings.

As shown in FIG. 5C a pattern of openings 76 is made (cut, drilled, punched, or machined in any suitable manner) in the first portion 71. These openings and their pattern may be any suitable shape opening in any desired pattern, including, but not limited to, any opening shape and pattern disclosed herein. The openings 76 may be of such a size that no additional screening material is placed over them; or, alternatively, any screening material disclosed herein, bonded or unbonded, may be placed over the openings 76.

Figure 5D:
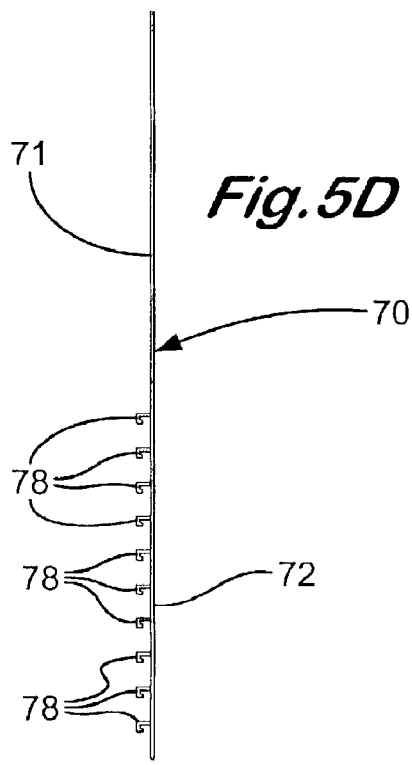
FIG. 5D is a side view of the material of FIG. 5C with support ribs now projecting from the material.
Figure 5E:
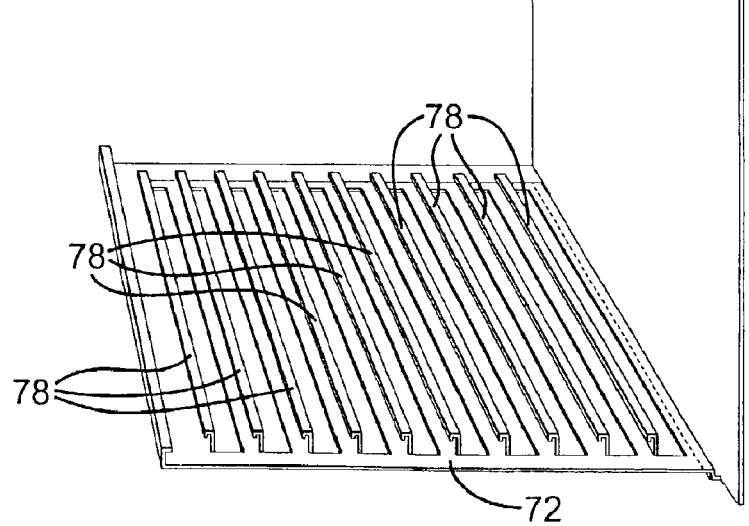
FIG. 5E shows the material of FIG. 5D with the portion with the pattern of openings at an angle with respect to the portion with the support ribs.

As shown in FIG. 5D rib supports 78 have been bent or folded away from the second portion 72. As shown in FIG. 5E the first portion 71 has been folded or bent with respect to the second portion 72. As shown in FIGS. 5F–5G the first portion 71 has been folded or bent over onto the second portion 72 so that an underside of the first portion 71 contacts top surfaces 79 of the rib supports 78. The first portion 71 may be glued, bolted, screwed, or welded to top surfaces 79 of the rib supports 78 [or Velcro™ material may be used to secure the portion 71 to the ribs 78]. FIGS. 5I–5K show the structure of FIG. 5F with screening material 80 thereon. The screening material 80 may be, in at least certain preferred embodiments, any known screen, screens, mesh, and/or meshes in any known combination, bonded or unbonded to each other, bonded or unbonded to the top portion 71, and/or of different weaves or similar weaves. As shown in FIGS. 5H and 5F the ends 73, 75 correspond, respectively, to ends 14 and 16 of the screen of FIG. 1A and function similarly to effect the sealing end-to-end abutment of such screens.

Figure 6:
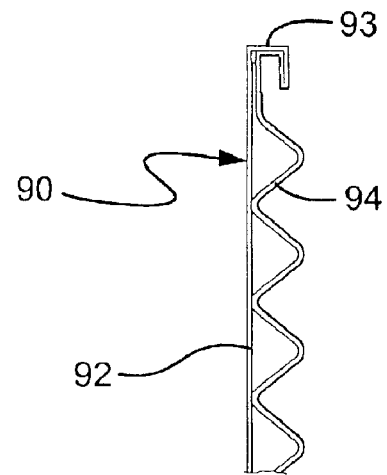
FIG. 6 is a side cross-section view of a screen assembly according to the present invention.

FIG. 6 shows a screen assembly 90 according to the present invention which has a unibody structure 92 which is substantially flat and with ends 93 folded or bent to form "hook strips" for securing the screen assembly 90 in various shakers and separators that employ such a screen connection apparatus. Such hook strips may be provided with any unibody structure disclosed herein. Such a unibody structure may be used instead of various prior art devices which employ, e.g. a plate to which channel-shaped members are welded or otherwise secured; for example, but without limitation, the unibody structure can be used in devices like those of U.S. Pat. Nos. 5,720,881 and 4,575,421 (and those of the references cited in these two patents) instead of the plate/channel-shaped member combinations disclosed in these patents. Screening material 94 (as any described herein with respect to layer(s), mesh(es), bonding etc.) has an undulating shape as viewed in FIG. 6. It is shown with lower parts touching and fixed to a top surface of the unibody structure 92, but it may be spaced-apart from this surface. It is within the scope of this invention to employ undulating screening material on any unibody structure and with any screen assembly disclosed herein. Optionally, the screening material 94 may be substantially flat. The unibody structure 92 may be, as viewed from above, like any unibody structure disclosed herein. In another aspect, the screening material 94 is a portion like the first portion 71 (FIG. 5A) and is folded over to a position as shown in FIG. 6, rather than affixed as a separate piece. Alternatively, what is shown as the screening material 94 in FIG. 6 may be a support structure for additional screening material placed thereon.

FIGS. 6A–6D show a screen panel 1150 according to the present invention with two opposed spaced-apart sides 1151 and 1152 spaced apart by two opposed sides 1153, 1154 and by a plurality of strips 1155. Each pair of spaced-apart strips, with portions of the sides 1151, 1152 define an open space 1156 through the panel 1150. At each side 1153, 1154, a strip 1155 and a portion of the side 1153 and side 1154 define an open space 1157 through the panel 1150.

In one aspect the panel 1150 (and/or strips and/or sides) is made of any suitable metal, e.g. but not limited to iron, steel, stainless steel, zinc, zinc alloys, aluminum, and aluminum alloys. In another aspect the panel is made of any suitable plastic, fiberglass, polytetrafluoroethylene cermet or composite. In one particular aspect the panel is made of 14 gauge cold rolled steel about 0.074 inches thick.

The openings in the panel may be made by any suitable method, including, but not limited to, drilling, sawing, or laser cutting. In one particular aspect a panel of 14 gauge cold rolled steel about 0.074 inches thick is laser cut with a $CO_2$ laser producing very precise and well-defined open spaces and very precise and well-defined strips 1155, in one aspect with strips about 0.22 inches wide, about 1.3 inches apart from each other.

In other aspects, the strips 1155 may range in width between about 0.10 inches to about 3.00 inches and they may be spaced apart between about 0.2 inches to about 4.00 inches. In one particular screen with about 0.22 inch wide strips spaced about 1.3 inches apart, the panel is 14 gauge cold rolled steel about 46.75 inches long, about 35.86 inches wide, about 0.074 inches thick with end portions, as viewed from above, about 1.65 inches wide between the screen ends" outer edge and the edge of an open space. Alternatively, the strips 1155 may be vertically oriented as viewed in FIG. 6A and the panel 1150 may be corrugated.

Alternatively, the outer edges of the panel 1150 may be provided and the strips, as separate pieces, connected thereto in any manner, shape, or design as described above herein.

Figure 6E:
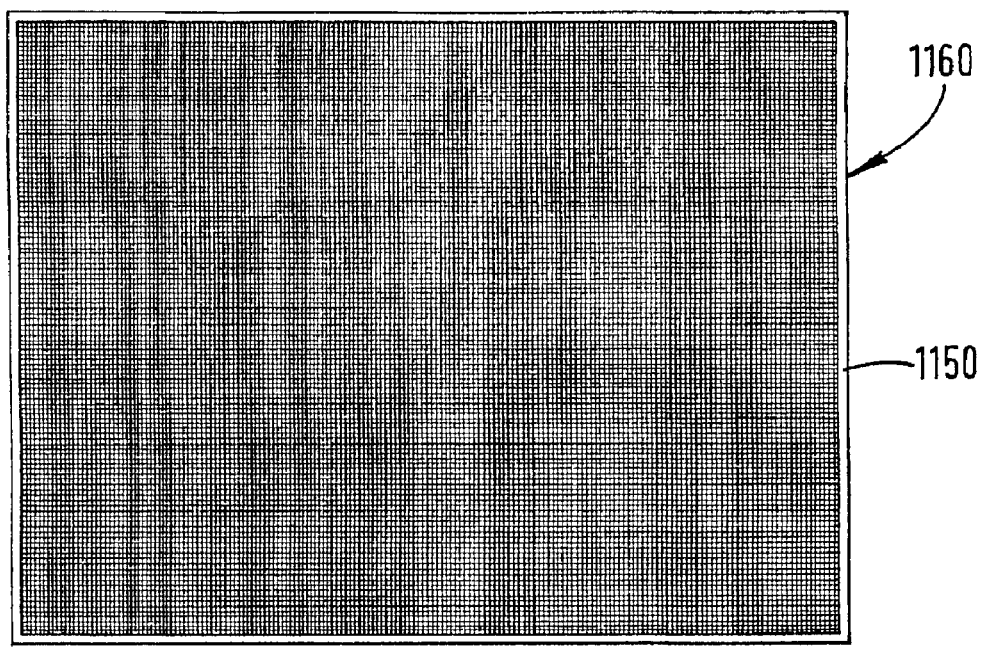
FIG. 6E is a top view.
Figure 6F:
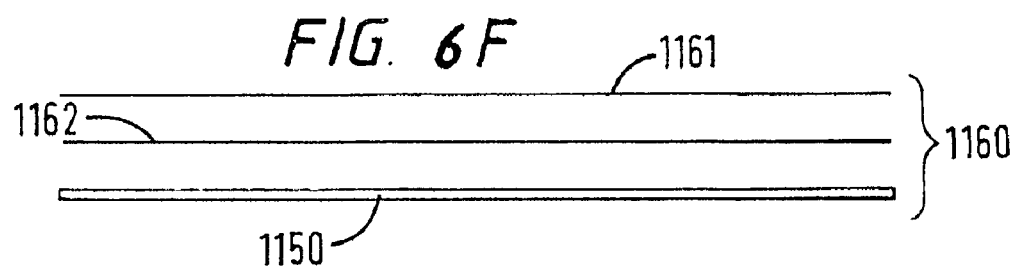
FIG. 6F is an exploded view of the screen assembly of FIG. 6E.

FIGS. 6E and 6F show a screen assembly 1160 according to the present invention with a panel 1150. A first mesh (in one aspect a fine mesh) 1161, e.g. 180 mesh, is bonded to a second mesh (in one aspect a backup mesh) 1162, e.g. 12 mesh which is then bonded to the panel 1150. In additional embodiments, the fine mesh may range between 14 mesh and 500 mesh and the backup mesh may range between 2 mesh and 30 mesh. Also, additional meshes may be used, including, but not limited to, any of the meshes and mesh combinations disclosed above herein, including the above-disclosed corrugated meshes in a flat configuration.

In other embodiments a backup mesh, middle mesh and a top mesh (in one aspect ranging between 100 mesh to 300 mesh) are used. In one aspect the backup mesh was 304 stainless steel 32 mesh with wire diameter of 0.045 inches, the middle mesh was 130 mesh 304 stainless steel with wire diameter of 0.0017 inches, and the top mesh was 304 stainless steel 180 mesh with a wire diameter of 0.0012 inches. A panel like the panel 1150 was coated with a powder coating (e.g. such as commercially available TK NOVO B Powder from Tuboscope Vetco) and bonded to the three meshes.

In other embodiments a backup mesh and a top mesh are used bonded together. In one aspect the backup mesh was 304 stainless steel 8 mesh with wire diameter of 0.025 inches, and the top mesh was 304 stainless steel 200 mesh with a wire diameter of 0.0021 inches. A panel like the panel 1150 was coated with a powder coating and bonded to the two meshes.

In other embodiments a backup mesh, middle mesh and a top mesh are used bonded together. In one aspect the backup mesh was 304 stainless steel calendared 8 mesh (with tops of ridges flattened) with wire diameter of 0.025 inches, and the top mesh was 304 stainless steel 180 mesh with a wire diameter of 0.0012 inches (or alternatively 200 mesh with a wire diameter of 0.0010 inches). A panel like the panel 1150 was coated with a powder coating and bonded to the three meshes.

Figure 7:
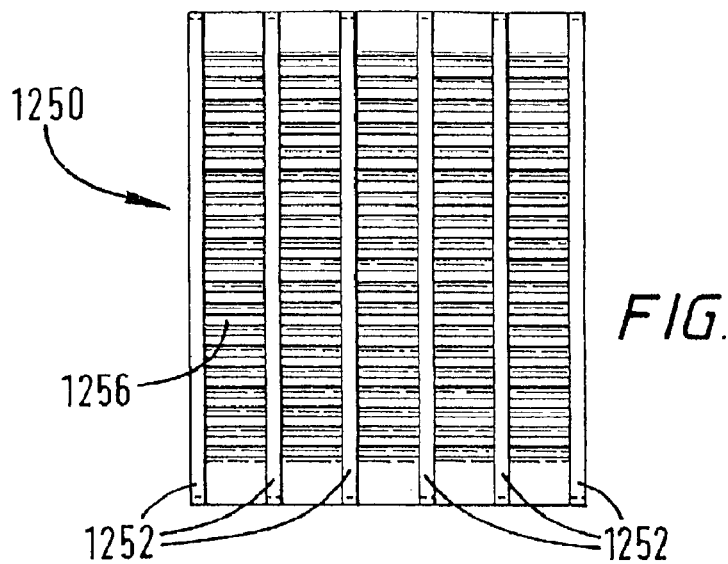
FIG. 7 is a bottom view of a screen according to the present invention.

FIG. 7 shows a screen 1250 which has a plurality of bottom support strips 1252, each of which has two upper in-turned edges formed into a mounting hook (not shown). Undulating screening material 1256 is bonded to the strips 1252. Flat material may, alternatively, be used.

Figure 8:
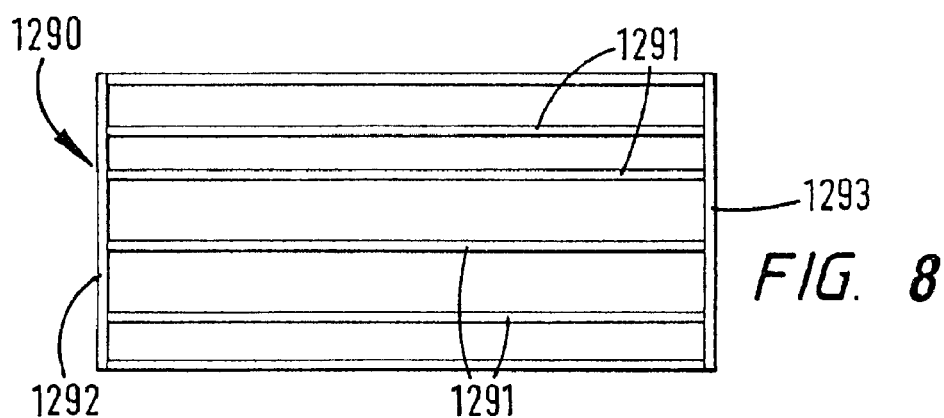
FIG. 8 is a bottom view of part of a screen with cross strips according to the present invention.

FIG. 8 shows a bottom strip support assembly 1290 for a screen according to the present invention. A plurality of strips 1291 extend between and are secured to frame sides 1292 and 1293.

In certain embodiments of a screen as in FIG. 8, the strips 1291 are between one-thirty second and one-eighth inches thick and about forty-five and a half inches long; the frame sides 1292, 1293 are about thirty six inches long; the strips 1291 are made from galvanized steel; and the frame sides 1292, 1293 are made from 20 gauge galvanized steel.

Figure 9:
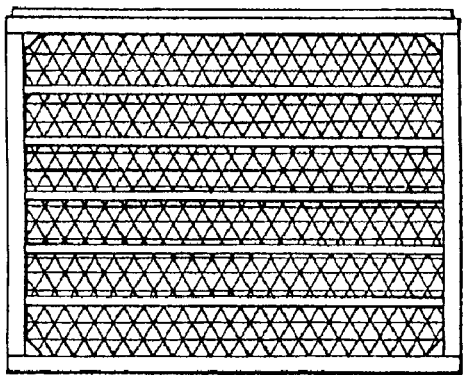
FIG. 9 is a bottom view of a screen according to the present invention.
Figure 10:
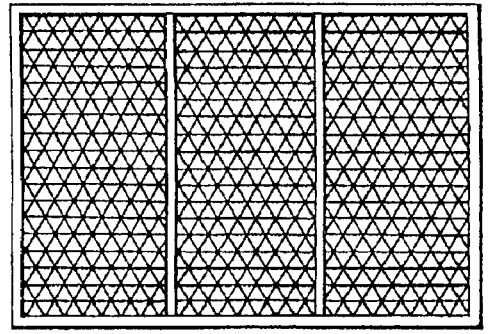
FIG. 10 is a bottom view of a screen according to the present invention.

Pending U.S. Pat. No. 5,971,159 issued Oct. 26, 1999 describes the items of FIGS. 9 and 10 in detail and these descriptions are incorporated herein fully for all purposes.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A unibody structure for a screen assembly for a vibratory separator, the unibody structure comprising an integral body member with a portion having a plurality of spaced-apart openings therethrough defining a pattern of a plurality of spaced-apart screening openings, the integral body member including a pair of spaced-apart integral side members comprising side portions folded to form the pair of spaced-apart integral side members, a pair of spaced-apart integral end members comprising end portions folded to form the pair of spaced-apart integral end members, the pair of spaced-apart integral end members including a first end member and a second end member, wherein the first end member is configured with a shoulder support portion adapted to sealingly abut a screen ledge end of an adjacent screen, wherein the second end member is configured with a ledge portion adapted to sealingly abut a shoulder portion of an end of an adjacent screen, wherein the plurality of spaced-apart openings of the integral body member are defined by a plurality of spaced-apart strips extending between the pair of spaced-apart integral side members, each adjacent pair of the plurality of spaced-apart strips defining a space therebetween through the integral body member, each strip of the plurality of spaced-apart strips having a strip length and being independent of each other strip of the plurality of spaced-apart strips along said strip length, and the integral body member having spaced-apart connector portions folded to form connection structure for securing the unibody structure to a vibratory separator apparatus.

2. The unibody structure of claim 1 wherein the connection structure comprises a hook strip on each of two spaced-apart sides of the unibody structure.

3. The unibody structure of claim 1 wherein the plurality of spaced-apart strips are substantially parallel to each other.

4. The unibody structure of claim 1 wherein the integral body member is made of material from the group consisting of iron, steel, stainless steel, zinc, zinc alloy, aluminum, aluminum alloy, plastic, polytetrafluoroethylene, fiberglass, cermet and composite.

5. The unibody structure of claim 1 wherein the strips of the plurality of spaced-apart strips are formed by cutting out the spaces therebetween with a laser.

6. The unibody structure of claim 1 wherein the strips of the plurality of spaced-apart strips range in width between about 0.10 inches and about 3.00 inches, and wherein the strips of the plurality of spaced-apart strips are spaced-apart between about 0.2 inches to about 4.00 inches.

7. The unibody structure of claim 1 wherein the strips of the plurality of spaced-apart strips have at least a portion thereof curved as viewed from above.

8. A unibody structure for a screen assembly for a vibratory separator, the unibody structure comprising an integral body member with a portion having a plurality of spaced-apart openings therethrough defining a pattern of a plurality of spaced-apart screening openings, the integral body member including a pair of spaced-apart integral side members comprising side portions folded to form the pair of spaced-apart integral side members, a pair of spaced-apart integral end members comprising end portions folded to form the pair of spaced-apart integral end members, the pair of spaced-apart integral end members including a first end member and a second end member, wherein the first end member is configured with a shoulder support portion adapted to sealingly abut a screen ledge end of an adjacent screen, wherein the second end member is configured with a ledge portion adapted to sealingly abut a shoulder portion of an end of an adjacent screen, wherein the plurality of spaced-apart openings of the integral body member are defined by a plurality of spaced-apart strips extending between the pair of spaced-apart integral side members, each adjacent pair of the plurality of spaced-apart strips defining a space therebetween through the integral body member, each strip of the plurality of spaced-apart strips having a strip length and being independent of each other strip of the plurality of spaced-apart strips along said strip length, and wherein the strips of the plurality of spaced-apart strips range in width between about 0.10 inches and about 3.00 inches, and wherein the strips of the plurality of spaced-apart strips are spaced-apart between about 0.2 inches to about 4.00 inches.

9. A screen assembly for a vibratory separator, the screen assembly comprising a unibody structure comprising an integral body member with a portion having a plurality of spaced-apart openings therethrough defining a pattern of a plurality of spaced-apart screening openings, the integral body member including a pair of spaced-apart integral side members comprising side portions folded to form the pair of spaced-apart integral side members.

a pair of spaced-apart integral end members comprising end portions folded to form the pair of spaced-apart integral end members, the pair of spaced-apart integral end members including a first end member and a second end member, wherein the first end member is configured with a shoulder support portion adapted to sealingly abut a screen ledge end of an adjacent screen, wherein the second end member is configured with a ledge portion adapted to sealingly abut a shoulder portion of an end of an adjacent screen, wherein the plurality of spaced-apart openings of the integral body member are defined by a plurality of spaced-apart strips extending between the pair of spaced-apart integral side members, each adjacent pair of the plurality of spaced-apart strips defining a space therebetween through the integral body member, each strip of the plurality of spaced-apart strips having a strip length and being independent of each other strip of the plurality of spaced-apart strips along said strip length, the integral body member having spaced-apart connector portions folded to form connection structure for securing the unibody structure to a vibratory separator apparatus, and screening material over the plurality of spaced-apart screening openings of the integral body member.

10. The screen assembly of claim 9 wherein the screening material comprises a first mesh connected to the plurality of spaced-apart strips, and a second mesh connected to the first mesh.

11. The screen assembly of claim 10 wherein the first mesh is a backup mesh ranging between 2 mesh and 30 mesh.

12. The screen assembly of claim 10 wherein the second mesh is a fine mesh ranging between 14 mesh and 500 mesh.

13. The screen assembly of claim 10 further comprising a third mesh on top of the second mesh.

14. The screen assembly of claim 13 wherein the first mesh is made of wire of a first diameter and the second mesh is made of wire of a second diameter smaller than the first diameter and the third mesh is made of wire of a third diameter smaller than the second diameter.

15. The screen assembly of claim 13 wherein the third mesh ranges between 100 mesh and 300 mesh.

16. The screen assembly of claim 15 wherein the third mesh is connected to the second mesh.

17. The screen assembly of claim 9 wherein the first mesh is made of wire of a first diameter and the second mesh is made of wire of a second diameter smaller than the first diameter.

18. The screen assembly of claim 9 wherein the screening material comprises multiple layers of screening material.

19. The screen assembly of claim 9 wherein the layers of screening material are bonded together.

20. Vibratory separator apparatus comprising screen assembly mounting apparatus, vibrator apparatus for vibrating the screen assembly mounting apparatus, screen assembly apparatus mounted on the screen assembly mounting apparatus, the screen assembly apparatus comprising a unibody structure comprising an integral body member with a portion having a plurality of spaced-apart openings therethrough defining a pattern of a plurality of spaced-apart screening openings, the integral body member including a pair of spaced-apart integral side members comprising side portions folded to form the pair of spaced-apart integral side members, a pair of spaced-apart integral end members comprising end portions folded to form the pair of spaced-apart integral end members, the pair of spaced-apart integral end members including a first end member and a second end member, wherein the first end member is configured with a shoulder support portion adapted to sealingly abut a screen ledge end of an adjacent screen, wherein the second end member is configured with a ledge portion adapted to sealingly abut a shoulder portion of an end of an adjacent screen, wherein the plurality of spaced-apart openings of the integral body member are defined by a plurality of spaced-apart strips extending between the pair of spaced-apart integral side members, each adjacent pair of the plurality of spaced-apart strips defining a space therebetween through the integral body member, each strip of the plurality of spaced-apart strips having a strip length and being independent of each other strip of the plurality of spaced-apart strips along said strip length, the integral body member having spaced-apart connector portions folded to form connection structure for securing the unibody structure to a vibratory separator apparatus, and screening material over the plurality of spaced-apart screening openings of the integral body member.

21. A method for treating fluid with a vibratory separator, the fluid having material therein to be separated therefrom, the method comprising, introducing the fluid onto a screen assembly in the vibratory separator, the screen assembly comprising a unibody structure comprising an integral body member with a portion having a plurality of spaced-apart openings therethrough defining a pattern of a plurality of spaced-apart screening openings, the integral body member including a pair of spaced-apart integral side members comprising side portions folded to form the pair of spaced-apart integral side members, a pair of spaced-apart integral end members comprising end portions folded to form the pair of spaced-apart integral end members, the pair of spaced-apart integral end members including a first end member and a second end member, wherein the first end member is configured with a shoulder support portion adapted to sealingly abut a screen ledge end of an adjacent screen, wherein the second end member is configured with a ledge portion adapted to sealingly abut a shoulder portion of an end of an adjacent screen, wherein the plurality of spaced-apart openings of the integral body member are defined by a plurality of spaced-apart strips extending between the pair of spaced-apart integral side members, each adjacent pair of the plurality of spaced-apart strips defining a space therebetween through the integral body member, each strip of the plurality of spaced-apart strips having a strip length and being independent of each other strip of the plurality of spaced-apart strips along said strip length, the integral body member having spaced-apart connector portions folded to form connection structure for securing the unibody structure to a vibratory separator apparatus, and screening material over the plurality of spaced-apart screening openings of the integral body member.

* * * * *